(12) United States Patent
Minachi

(10) Patent No.: US 11,119,031 B2
(45) Date of Patent: Sep. 14, 2021

(54) CORROSION RATE MONITORING USING ULTRASOUND, AND ASSOCIATED SYSTEMS AND METHODS

(71) Applicant: Quest Integrated, LLC, Kent, WA (US)

(72) Inventor: Ali Minachi, Kent, WA (US)

(73) Assignee: Quest Integrated, LLC, Kent, WA (US)

( * ) Notice: Subject to any disclaimer, the term of this patent is extended or adjusted under 35 U.S.C. 154(b) by 0 days.

(21) Appl. No.: 16/639,097

(22) PCT Filed: Aug. 14, 2018

(86) PCT No.: PCT/US2018/046677
§ 371 (c)(1),
(2) Date: Feb. 13, 2020

(87) PCT Pub. No.: WO2019/036453
PCT Pub. Date: Feb. 21, 2019

(65) Prior Publication Data
US 2020/0209143 A1  Jul. 2, 2020

Related U.S. Application Data

(60) Provisional application No. 62/545,359, filed on Aug. 14, 2017.

(51) Int. Cl.
*G01N 17/04*  (2006.01)
*G01N 29/44*  (2006.01)
(Continued)

(52) U.S. Cl.
CPC ............. *G01N 17/04* (2013.01); *G01B 17/02* (2013.01); *G01N 17/00* (2013.01); *G01N 25/72* (2013.01);
(Continued)

(58) Field of Classification Search
CPC ...... G01N 17/04; G01N 25/72; G01N 29/043; G01N 29/2437; G01N 29/04;
(Continued)

(56) References Cited

U.S. PATENT DOCUMENTS

2002/0194916 A1\* 12/2002 Yamada ............... G01B 17/025
73/627
2006/0101916 A1   5/2006 Griffiths et al.
(Continued)

FOREIGN PATENT DOCUMENTS

CN      108896664 A  \* 11/2018
GB        2512835 A  \* 10/2014  ............ G01B 17/06

OTHER PUBLICATIONS

International Search Report and Written Opinion, dated Nov. 15, 2018, issued in priority International Application No. PCT/US2018/046677, filed Aug. 14, 2018, 10 pages.

*Primary Examiner* — Ryan D Walsh
(74) *Attorney, Agent, or Firm* — Christensen O'Connor Johnson Kindness PLLC

(57) ABSTRACT

Systems and methods for determining rate of corrosion in pipes and other structures are disclosed herein. In one embodiment, a method for measuring a rate of corrosion progress in a specimen includes: generating a first initial pulse into the specimen by an ultrasonic transducer, and acquiring a first reflected waveform from the specimen. The first reflected waveform includes a first reflection of the first waveform and a second reflection of the first waveform. The method also includes generating a second initial pulse into the specimen by the ultrasonic transducer. The first initial pulse and the second initial pulse are separated by a time period. The method also includes acquiring a second reflected waveform from the specimen. The second reflected (Continued)

waveform includes a first reflection of the second waveform and a second reflection of the second waveform.

19 Claims, 18 Drawing Sheets

(51) Int. Cl.
*G01N 17/00* (2006.01)
*G01B 17/02* (2006.01)
*G01N 29/07* (2006.01)
*G01N 25/72* (2006.01)
*G01N 29/04* (2006.01)
*G01N 29/24* (2006.01)

(52) U.S. Cl.
CPC ........... *G01N 29/04* (2013.01); *G01N 29/043* (2013.01); *G01N 29/07* (2013.01); *G01N 29/2437* (2013.01); *G01N 29/4418* (2013.01); *G01N 29/4463* (2013.01); *G01N 2291/011* (2013.01); *G01N 2291/0234* (2013.01); *G01N 2291/0258* (2013.01); *G01N 2291/0289* (2013.01); *G01N 2291/044* (2013.01)

(58) Field of Classification Search
CPC ........... G01N 29/4418; G01N 29/4463; G01N 17/00; G01N 29/07; G01N 2291/0234; G01N 2291/0289; G01N 2291/2634; G01N 2291/0258; G01N 2291/044; G01N 2291/011; G01B 17/02
See application file for complete search history.

(56) References Cited

U.S. PATENT DOCUMENTS

| | | |
|---|---|---|
| 2006/0288756 A1 | 12/2006 | De Meurechy |
| 2009/0257311 A1 | 10/2009 | Daigle |
| 2011/0067497 A1 | 3/2011 | Grubb et al. |
| 2011/0090935 A1* | 4/2011 | Cuffe .................... G01K 11/22 374/117 |
| 2012/0167688 A1 | 7/2012 | Minachi et al. |
| 2020/0011838 A1* | 1/2020 | Bondurant ............ G01N 29/11 |

* cited by examiner

CORROSION RATE MONITORING USING ULTRASOUND, AND ASSOCIATED SYSTEMS AND METHODS

CROSS-REFERENCE(S) TO RELATED APPLICATION

This application is a national phase application under Sec. 371 of International Application No. PCT/US2018/046677, filed Aug. 14, 2018, which claims the benefit of U.S. Provisional Application No. 62/545,359, filed on Aug. 14, 2017, the contents of which are incorporated herein by reference.

BACKGROUND

As one of the consequences of aging infrastructure, costs associated with corrosion are increasing rapidly for many industries. The corrosion costs in the U.S. rose above $1 trillion in 2013 based on a study by NACE that estimated direct corrosion costs at $276B in 1998. In addition to the cost of replacement and maintenance of corroded parts, corrosion can cause significant damage to lives, environment and infrastructure by allowing dangerous and volatile materials to the environment. Because the natural process of corrosion cannot be avoided, many industries attempt to manage this process and avoid the unplanned consequences of corrosion.

FIG. 1 is a schematic view of corrosion detection in accordance with prior art. Some conventional technologies generate ultrasonic waves by a piezoelectric transducer in a solid material 6 (e.g., a metal plate). The piezoelectric transducer includes a vibrating crystal 10 and a backing material 12 that quiets down the vibrating crystal 10. Gel or fluid couplant (not shown) transfers vibrations from the vibrating crystal 10 onto the solid material 6 (e.g., a steel plate). The vibrating crystal 10 is electrically powered through cable 14. Most piezoelectric transducers are made of Lead Zirconate Titanate (PZT). In this specification, the piezoelectric transducers are also referred to as PZTs for simplicity and brevity, even though the materials other than Lead Zirconate Titanate may be used as the vibrating crystal 10.

When the ultrasonic waves reach a corrosion 61 (or other discontinuity in the crystal lattice), a reflected ultrasonic wave is generated. These reflected waves can be detected by the same generating PZT element or by a different receiver that is also a PZT. At the receiving PZT, the reflected ultrasonic waves cause a reverse piezo-effect, which can be measured to detect the intensity of the returning ultrasound. These measurements can be further analyzed to characterize the corrosion and the remaining thickness of the specimen.

Corrosion can be particularly problematic for piezoelectric transducer (PZT) wall thickness measurements due to the scattering of the ultrasonic energy off the corrosion patches. Furthermore, PZTs operate with difficulty over the pipes having relatively thin walls, e.g., 0.25 to 0.5 inches with further thinning due to the corrosion, because the first return echo, which may be the only echo with a detectable amplitude, may be buried in the "main bang" of the signal (also referred to as a "dead zone").

Broadly speaking, two types of corrosion deteriorate metallic parts: "general corrosion" and "pitting corrosion." General (or uniform) corrosion occurs over a large area of an exposed surface with more or less uniform thinning of the material and a rough surface of the corrosion patch. Pitting corrosion occurs in isolated locations or in colonies on an exposed surface and takes the form of cavities or holes that can go all the way through the thickness of the materials.

General corrosion is simpler to detect and monitor because it is uniform and occurs over a large area. Pitting corrosion is more dangerous and difficult to detect. Pits can start from any point on an exposed surface and, because of their small size, the pits may be missed and not detected. Operators perform regular inspection of large areas to detect and monitor both types of corrosion. When the point of greatest corrosion is found—the point where the material is the thinnest—that point is monitored to ensure it does not go beyond its critical size.

In recent years, corrosion monitoring has become a popular corrosion management strategy for many industries. In this corrosion monitoring technique, special sensors are used to constantly (periodically) monitor the condition of corroded regions and the results are analyzed to ensure that corrosion does not reach a critical condition. Generally, the sensors for corrosion monitoring systems are permanently installed and the measurements are transferred wirelessly to a control room for further analysis. In some monitoring systems, parameters can be set in a computer program to initiate a warning if a critical condition has been reached.

Corrosion monitoring systems mostly measure the remaining wall thickness at a given location. These measurements do not require very high accuracy. Operators are generally satisfied to know the remaining wall thickness within ±0.5 mm (500 microns). When the remaining wall thickness falls below a critical point, the operators will typically take corrective actions (e.g., replace or repair the corroded segment of the pipe). Because the corrosion process is generally slow, the remaining wall thickness must be monitored for a long period of time until the critical point is reached. In low-corrosion-rate areas, many years can pass before the part reaches a critical remaining wall thickness.

Although the corrosion monitoring technique can be an effective way to avoid the adverse effects of corrosion, the monitoring sensors (e.g., PZTs) are generally expensive and require ongoing maintenance and upgrading to remain functional throughout the years of operation. Because corrosion requires a long period of time to reach a critical point, constant monitoring is not an efficient way of corrosion management.

In most cases, the corrosion process is constant under steady operating parameters (temperature, flow rate, flow content, etc.). The rate of metal loss is steady if all the environmental parameters surrounding the corroded region remain the same. Therefore, when a corrosion process has been initiated and metal degradation has started, determining the corrosion rate allows operators to develop a fairly good estimate of the remaining life of the part. Even when environmental parameters surrounding the corroded region are not constant, determining the transient corrosion rate can help the operators to determine what parameters affect the corrosion process. Hence, measuring the corrosion rate can provide very valuable information about the remaining life of a part and can eliminate the need for and cost of continuous corrosion monitoring.

A typical corrosion monitoring system is only active while it collects data. Thus, a corrosion monitoring system sits idle most of the time. This fact makes such corrosion monitoring systems inefficient. Moreover, sensors and other components deteriorate throughout the system's operational life and become obsolescent as more advanced technologies are developed. A more rapid means for determining the corrosion rate may allow operators to predict and plan corrective actions before the critical point is reached.

Of course, the corrosion rate can be easily obtained by monitoring the remaining wall thickness and determining the rate of wall loss per unit of time (months or years). However, the process of corrosion is generally very slow and the accuracy of measuring the remaining wall thickness is low. Measuring the corrosion rate as a function of wall loss per unit time requires a long period of time to produce accurate and meaningful data. A very precise measurement of the change in the remaining wall thickness is required to be able to quickly measure the remaining life of a part.

Accordingly, there remains a need for cost effective test methods that can accurately measure remaining thickness of the wall pipe and efficiently estimate the remaining life of the pipe or other structure.

DESCRIPTION OF THE DRAWINGS

The aspects of the present disclosure can be better understood with reference to the following drawings. The components in the drawings are not necessarily to scale. Instead, emphasis is placed on clearly illustrating the principles of the present disclosure.

SUMMARY

Figure 1:
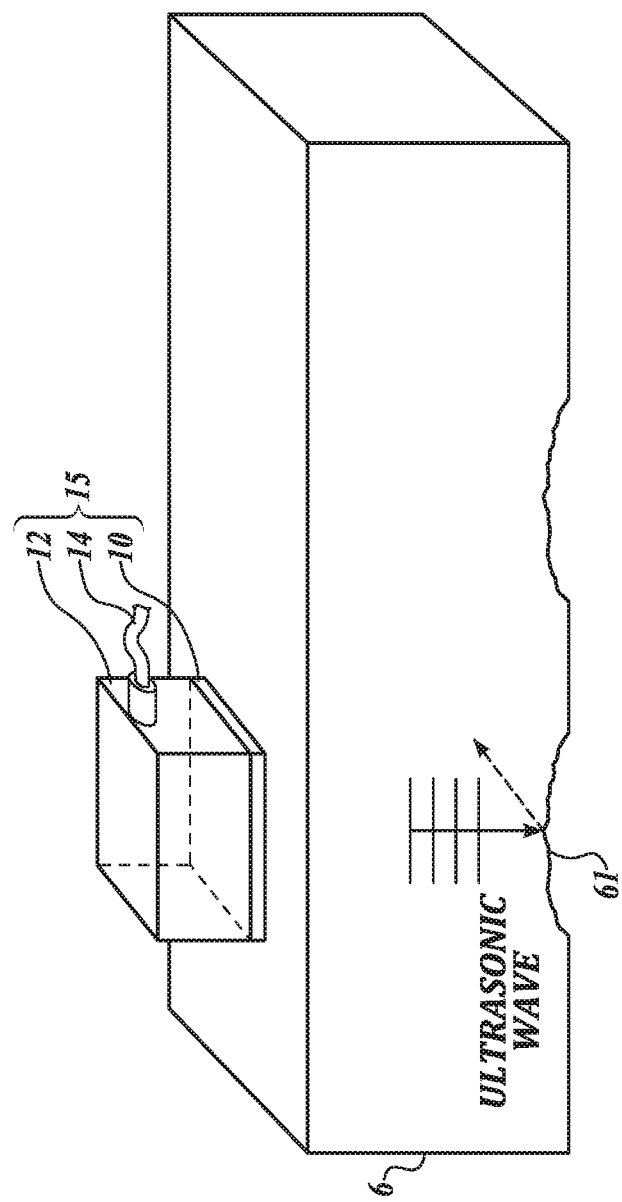
FIG. 1 is a schematic view of corrosion detection in accordance with prior art.

The inventive technology relates to piezoelectric sensors that can quantify the rate of loss of the remaining wall thickness of pipelines or other structures. Most piezoelectric transducers are made of Lead Zirconate Titanate (PZT). In this specification, the piezoelectric transducers are also referred to as PZTs for simplicity and brevity, even though the materials other than Lead Zirconate Titanate may be used as the vibrating crystal 10.

In many practical applications, pipe replacement or other preventive maintenance is scheduled in advance based on the predictions of the remaining useful life of the pipeline, which, in turn, is a function of the corrosion rate. With the inventive technology, the accuracy of the corrosion rate measurement may be improved, while the time required to perform the measurement is reduced.

In general, the traditional liquid/gel coupled PZT systems have difficulty in obtaining measurements when the pipe or other structure is corroded. In particular, the sloped sides of corrosion patches scatter the impinging ultrasonic signal, thereby either blurring the returning signal or entirely preventing the measurement of the reflected signal. Furthermore, since corrosion is a relatively slow process, corrosion measurements must be performed over a relatively long period of time to capture appreciable differences between two states of the corroded pipe. The separation between the consecutive measurements may be, for example, many months. However, in some embodiments of the inventive technology, measurements of losses in wall material are accurate at several micron levels. As a result, useful corrosion rate data may be obtained within a few weeks or months of measurements in contrast to the longer time required by the conventional technology.

Most ultrasonic measurements are performed to find the thickness of materials. The disclosed embodiments can be used to measure the thickness of materials, but it is also capable of determining the change in thickness accurately and precisely. Since most thickness changes in metallic materials are due to corrosion, measuring the change in thickness over a period of time improves the accuracy of measuring the corrosion rate.

In some embodiments, to measure the change in thickness or corrosion rate multiple ultrasonic readings are taken. These embodiments can measure changes in thickness at the micron level. Thus, by taking ultrasonic readings over a period of a few weeks or months (depending on corrosion rate), the corrosion rate can be found.

In some embodiments, delay line is used as a reference signal to reduce changes in factors affecting the ultrasonic readings taken at different periods. When the reflected signals from the end of the delay line between two ultrasonic readings are synchronized, factors modifying the signals before the reflected signals may be reduced. These factors include changes in transmitter (pulser, TX) and receiver (RX) equipment or change in temperature of the delay line.

To measure thickness or thickness changes using an ultrasonic method requires measurement of the time difference between two signals. In some embodiments, the time difference is the measure between similar signals taken at different times. Even if the back surface reflected signals are distorted due to corrosion, the distorted signals from two waveforms (that are generally similar) can be measured against each other to achieve more accurate results.

Modern ultrasonic thickness gauging devices digitally record and store data representing the ultrasonic waveforms. However, prior art measurements using these recorded waveforms are susceptible to digitization errors. In some embodiments of the present technology, curves (e.g., polynomials or splines) are analytically fitted through the experimental data. Next, these analytically-obtained waveforms are resampled at higher frequency to obtain additional sample points. In some embodiments, the samples are cross-correlated to determine time shifts more accurately.

In one embodiment, a method for measuring a rate of corrosion progress in a specimen includes: generating a first initial pulse into the specimen by an ultrasonic transducer; acquiring a first reflected waveform from the specimen, wherein the first reflected waveform includes a first reflection of the first waveform and a second reflection of the first waveform; and generating a second initial pulse into the specimen by the ultrasonic transducer. The first initial pulse and the second initial pulse are separated by a time period. The method also includes: acquiring a second reflected waveform from the specimen, where the second reflected waveform includes a first reflection of the second waveform and a second reflection of the second waveform; and determining the rate of corrosion by:

aligning the first reflection of the first waveform and the first reflection of the second waveform, determining a time difference between the second reflection of the first waveform and the second reflection of the second waveform, and based on the time difference, determining the rate of corrosion progress using a speed of ultrasound through the specimen.

In one aspect, the ultrasonic transducer includes a delay line. In one aspect, the first reflection of the first waveform and the first reflection of the second waveform are first reflections from the delay line. In another aspect, the second reflection of the first waveform and the second reflection of the second waveform are first reflections from a back wall of the specimen. In another respect, the first reflection of the first waveform and the first reflection of the second waveform are first reflections from a back wall of the specimen. In one aspect, the second reflection of the first waveform and the second reflection of the second waveform are second reflections from a back wall of the specimen.

In one aspect, the method includes: fitting a first curve through discrete points of the first reflection of the first waveform; and fitting a second curve through discrete points of the first reflection of the second waveform. Aligning the first reflection of the first waveform and the first reflection of the second waveform is based on aligning the first curve and the second curve. In one aspect, the first curve and the second curve are selected from a group consisting of a polynomial and a spline.

In one aspect, the first reflected waveform and the second reflected waveform are acquired at a first sampling frequency. The method also includes: resampling the first curve and the second curve at a second sampling frequency that is higher than the first sampling frequency; aligning the first reflection of the first waveform and the first reflection of the second waveform based on additional discrete points obtained by the second sampling frequency.

In one aspect, the method also includes: cross-correlating the first curve and the second curve; identifying a maximum of a cross-correlation between the first curve and the second curve; and aligning the first reflection of the first waveform and the first reflection of the second waveform at least in part based on the maximum of the cross-correlation.

In one aspect, aligning the first reflection of the first waveform and the first reflection of the second waveform is based on aligning a maximum of the first reflection of the first waveform and a maximum of the first reflection of the second waveform. In another aspect, aligning the first reflection of the first waveform and the first reflection of the second waveform includes superimposing the first reflection of the first waveform and the first reflection of the second waveform over each other when the first waveform and the second waveform are displayed visually.

In one aspect, the method includes: generating additional initial pulses into the specimen by the ultrasonic transducer; acquiring additional reflected waveforms from the specimen; and averaging the additional multiple waveforms to produce averaged first reflected waveform and averaged second reflected waveform. In another aspect, the time period is less than one month. In one aspect, the method includes: measuring a first temperature of the specimen corresponding to the first reflected waveform from the specimen; measuring a second temperature of the specimen corresponding to the second reflected waveform from the specimen; and determining the rate of corrosion based at least in part on a difference between the first temperature and the second temperature.

In one embodiment, non-transitory computer readable medium having computer-executable instructions stored thereon that, in response to execution by one or more processors of a computing device, cause the computing device to perform actions of: generating a first initial pulse into the specimen by an ultrasonic transducer comprising a delay line; acquiring a first reflected waveform from the specimen, where the first reflected waveform includes a first reflection of the first waveform and a second reflection of the first waveform; generating a second initial pulse into the specimen by the ultrasonic transducer, where the first initial pulse and the second initial pulse are separated by a time period; acquiring a second reflected waveform from the specimen, wherein the second reflected waveform includes a first reflection of the second waveform and a second reflection of the second waveform; and determining the rate of corrosion by:

aligning the first reflection of the first waveform and the first reflection of the second waveform, determining a time difference between the second reflection of the first waveform and the second reflection of the second waveform, and based on the time difference, determining the rate of corrosion progress using a speed of ultrasound through the specimen.

In one aspect, the first reflection of the first waveform and the first reflection of the second waveform are first reflections from the delay line. In another aspect, the second reflection of the first waveform and the second reflection of the second waveform are first reflections from a back wall of the specimen.

In one aspect, the actions further include: fitting a first curve through discrete points of the first reflection of the first waveform; and fitting a second curve through discrete points of the first reflection of the second waveform. Aligning the first reflection of the first waveform and the first reflection of the second waveform is based on aligning the first curve and the second curve.

In one aspect, the actions further include: generating additional initial pulses into the specimen by the ultrasonic transducer; acquiring additional reflected waveforms from the specimen; and averaging the additional multiple waveforms to produce averaged first reflected waveform and averaged second reflected waveform.

In one aspect, the actions further include: fitting a first curve through discrete points of the first reflection of the first waveform; fitting a second curve through discrete points of the first reflection of the second waveform, cross-correlating the first curve and the second curve; and identifying a maximum of a cross-correlation between the first curve and the second curve. Aligning the first reflection of the first waveform and the first reflection of the second waveform is based at least in part on the maximum of the cross-correlation.

DETAILED DESCRIPTION

Corrosion rates can be categorized into three categories: severe, high and low. These three categories should not be understood as a rigorous standard, but instead this categorization provides exemplary timelines for the metal to be degraded under each category. These sample categories are presented in Table 1, which provides timelines for the complete degradation of a ¼" thick metal pipe under the three categories.

In an exemplary case of severe corrosion in a ¼" thick pipe with a corrosion rate of 106 microns per month (1.27 mm per year), the pipe loses its entire wall thickness in 5 years. In some embodiments of the inventive technology, the non-corroded thickness of the pipe can be estimated to within ±10 microns (±10*10$^{-6}$ m) in contrast to the typical ±500 microns of the prior art technologies.

If the corrosion rate in such a pipe is measured during a one-month period with an accuracy of ±10 microns, the uncertainty in measuring the prospective life of such a pipe (total deterioration of its wall thickness due to corrosion) is approximately ±5 months (5 years±5 months). However, when the measurement period is expanded from one month to two months with the same accuracy of ±10 microns, the uncertainty in measuring the remaining life of the pipe is reduced to ±3 months (5 years±3 months).

TABLE 1

Corrosion rates of pipes

| Severe | High | Low |
|---|---|---|
| Leak in a ¼" thick pipe less than 5 years | Leak in a ¼" thick pipe within 10-30 years | Leak in a ¼" thick pipe more than 40 years |
| >1.3 mm/year | ≈212-635 μm/year | <159 μm/year |
| (>50 mil/year) | (≈8-25 mil/year) | (<6 mil/year) |
| >106 μm/Month | ≈18-53 μm/Month | <13 μm/Month |
| (>4 mil/Month) | (≈0.7-2 mil/Month) | (<0.5 mil/Month) |

The same analysis is possible for high and low corrosion categories. For example, a ¼" thick pipe with a high corrosion rate of 53 microns per month will lose its entire thickness in 10 years. When the corrosion rate for this pipe is measured over a two-month period with an accuracy of ±10 microns, the uncertainty in measuring the remaining life of this pipe will be approximately ±1 year (10 years±1 year). If the measurement period is performed over three months instead of two months with the same accuracy of ±10 microns, the uncertainty in measuring the remaining life of the pipe is reduced to ±7 months (10 years±7 months).

In the third illustrative case, a ¼" thick pipe with a high corrosion rate of 18 microns per month loses its entire thickness in 30 years. If the corrosion rate for this pipe is measured during a two-month period with an accuracy of ±10 microns, the uncertainty in measuring the remaining life of this pipe is approximately ±7-10 years (30 years±7-10 years). When the measurement period is performed over three months instead of two months with the same accuracy of ±10 microns, the uncertainty in measuring the remaining life of the pipe is reduced to ±5 years (30 years±5 years).

As can be seen from the above results, everything else being equal, pipes having relatively low corrosion rates require longer observation periods to support accurate lifetime estimates. These results are based on taking two measurements: one at the beginning of the period and one few weeks or months later at the end of the period. Many measurements can be taken during an observation period and a more accurate corrosion rate measurement may be found for the same accuracy of ±10 microns.

In practice, when the operators of pipelines know the accurate corrosion rate for a given location on the pipe, they act before the corrosion has consumed the entire wall thickness. For example, when the wall thickness reaches a critical limit (50-70% wall loss), the pipe is repaired or replaced. Therefore, determining corrosion rates with an accuracy of ±10 microns can greatly assist operators to plan both inspection and repair maintenance during regular shutdown periods.

Figure 2A:
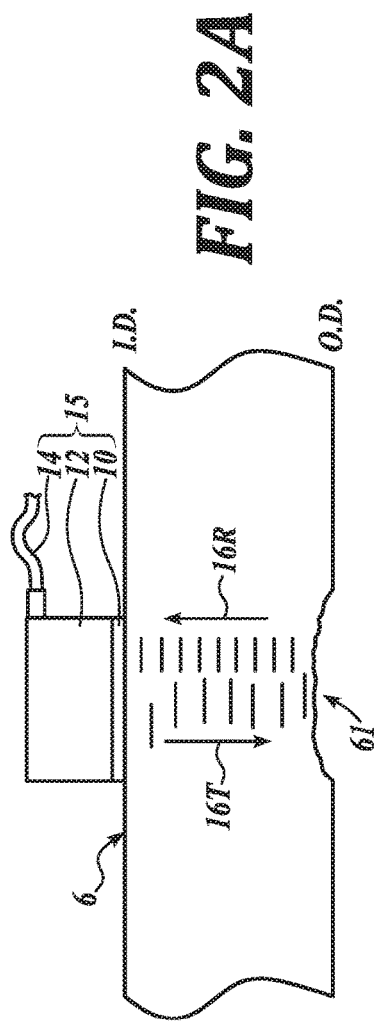
FIG. 2A is a schematic drawing of a PZT system measurement in accordance with embodiments of the presently disclosed technology.

FIG. 2A is a schematic drawing of a PZT ultrasonic transducer in accordance with embodiments of the presently disclosed technology. The PZT 15 generates ultrasound signals toward a corrosion patch or pit 61. Arrow 16T indicates direction of the transmitted signal, and arrow 16R indicates direction of the reflected ultrasound signal. The reflected signal is acquired by the same PZT.

Measurements Based on Initial Pulse

Figure 2B:
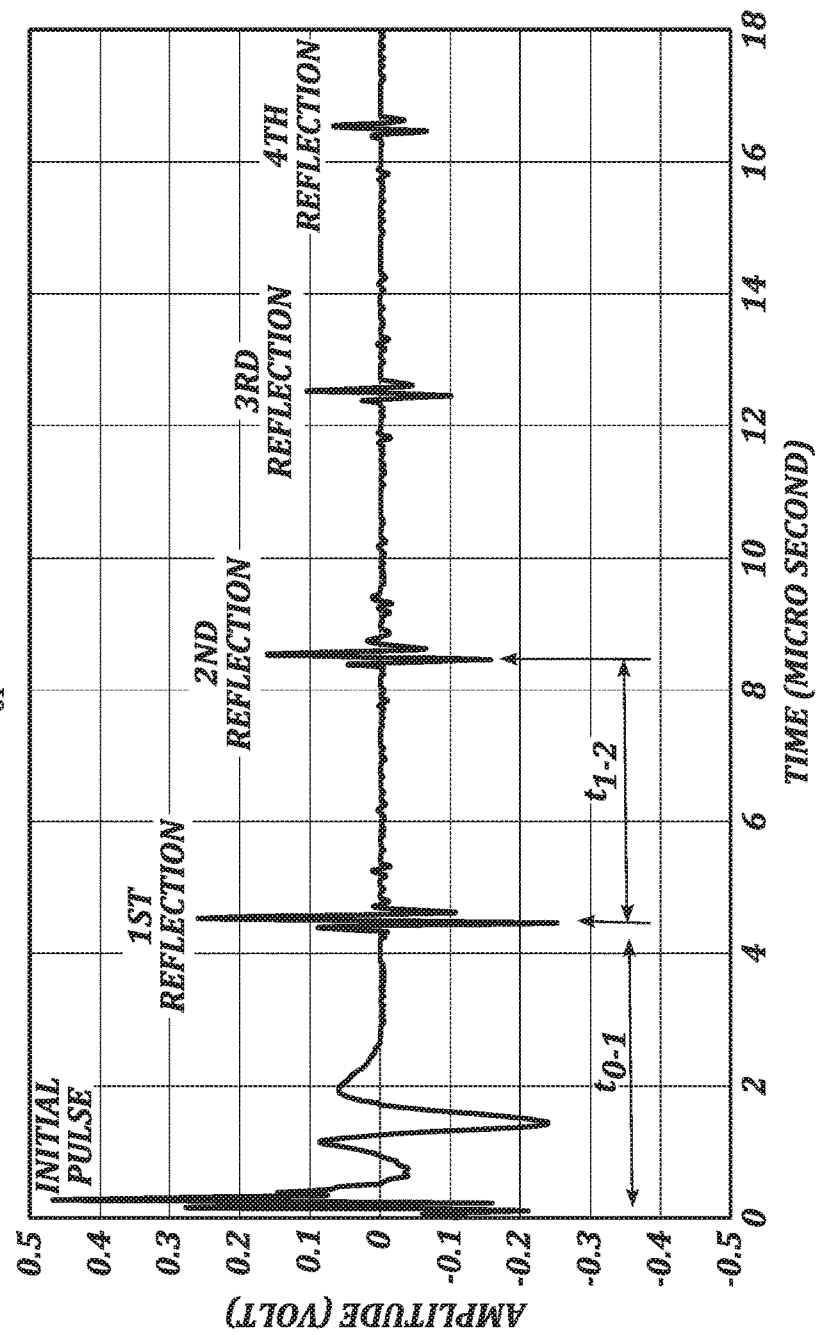
FIG. 2B is a graph of transducer signal obtained using the system of FIG. 2A.

FIG. 2B is a graph of ultrasonic transducer signal obtained using the system of FIG. 2A. The horizontal axis represents time in micro seconds, and the vertical axis represents signal amplitude in volts. In the illustrated graph, the ultrasonic waves reverberated several times between top and bottom surfaces of the sample 6 (also referred to as specimen, pipe, or structure), as indicated with "1$^{st}$ reflection," "2$^{nd}$ reflection," etc., in the graph. With the successive reflections, the amplitude of the ultrasonic waves attenuates because of the ultrasound diffraction and absorption.

In the illustrated graph of FIG. 2B, the initial pulse occurs over a short duration of time as the transducer is charged with a high voltage. Generally, after generating the ultrasound waves, the transducer takes a few microseconds of "dead zone" to mechanically "quiet down" before receiving the first reflected signal ("1$^{st}$ reflection" in the graph). The thickness of the sample may be determined from the time that it takes for the ultrasonic waves generated by the initial pulse to travel from the transducer, reflect from the back surface of the sample, and return to the transducer. Measuring the time from the initial pulse to the first reflection from the back surface allows the thickness of the sample to be calculated. For example, if it takes $t_{0-1}$ seconds from the initial pulse to the 1$^{st}$ reflection and the speed of sound in the sample is v m/s, then the thickness (D) of the non-corroded sample is:

$$D = \frac{t_{0-1} \times v}{2} \quad (1)$$

However, the measurements of $t_{0-1}$ may be difficult because the exact times when the initial pulse and the $1^{st}$ reflection begin are difficult to determine precisely. As a result, the time between the two signals may not be ascertainable with precision.

With the conventional technology, pipe inspectors rely on the $1^{st}$ reflection to perform their measurements. Typically, to perform thickness gauging using the $1^{st}$ reflection, a calibration sample with a known thickness and material similar to the pipe is used to calibrate the thickness gauging device. This calibration first determines two points on the initial pulse and the $1^{st}$ reflection and measures the time difference between these two points. Then, the speed of sound (v) in equation (1) is adjusted in a way to calculate the thickness (D) similar to the calibration sample. Based on this calibration, the thickness of the pipe is calculated at different locations. Even for a pipe of sufficient thickness and under favorable field conditions, the conventional ultrasonic thickness (UT) measurements achieves ±0.1 mm (±100 micron) accuracy. As a result, estimating the rate of corrosion requires a relatively long time to reduce the measurement errors.

Measurements Based on Multiple Reflections

In some embodiments of the present technology, the thickness of the sample is determined based on the time difference between the signal in the $1^{st}$ and $2^{nd}$ reflections. In many embodiments, the general shapes of the $1^{st}$ and $2^{nd}$ reflection signals are similar because the signal has not decayed or dispersed too much between the two consecutive reflections. Therefore, since the signals of the $1^{st}$ and $2^{nd}$ reflections retain similarity, the time between similar points of the two signals can be used to measure a representative time delay between the two reflections, as explained below.

In some embodiments, two minima (or maxima, or any extrema) of the signals may be chosen and the time between these two points ($t_{1-2}$) can be used to determine the thickness of the sample using equation (2) below.

$$D = \frac{t_{1-2} \times v}{2} \tag{2}$$

In many practical applications, the initial pulse takes a few microseconds of "dead zone" to dissipate. In the illustrated graph of FIG. 2B, the initial pulse lasts about 3 microseconds. Therefore, as the thickness of the pipe is reduced, the time it takes for the $1^{st}$ reflection to return is also reduced. For a relatively small thickness of the material, the $1^{st}$ reflection may arrive before the initial pulse (dead zone) is completely dissipated and the two signals may overlap. In the example illustrated in FIG. 2B, if $t_{0-1}$ becomes 3 microseconds or less, the $1^{st}$ reflection will be mixed into the initial pulse. Using equation (1) and considering the speed of sound in carbon steel as v=5.9 mm/microsecond, the minimum observable thickness D of the sample is 8.85 mm (0.348 inch). Therefore, even when using the signals of the $1^{st}$ and $2^{nd}$ reflections, determining the exact time difference between the two subsequent reflections may be difficult.

Reducing Dead Zones Using Dual Element Transducers

Figure 3A:
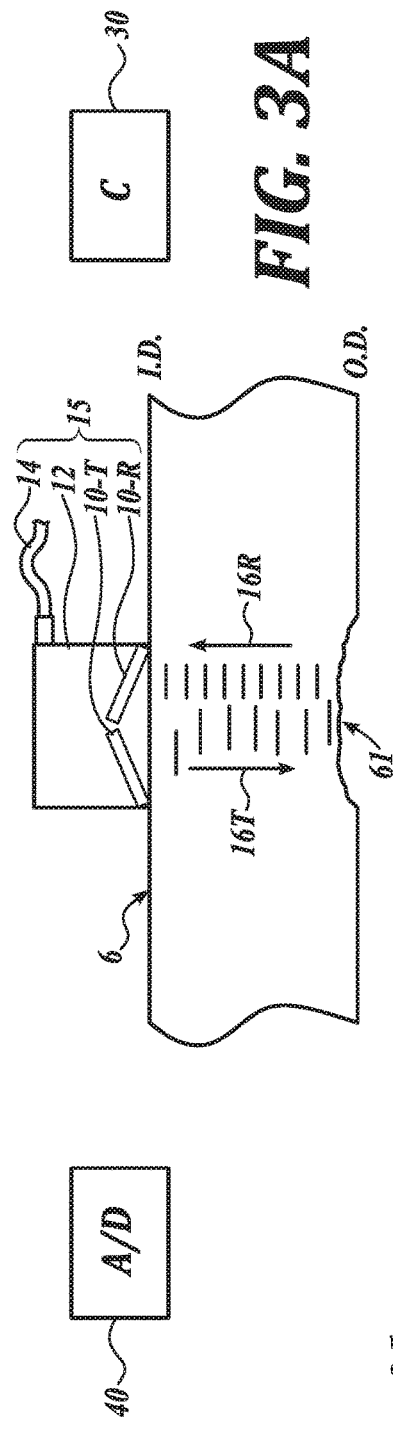
FIG. 3A is a schematic drawing of a PZT system measurement in accordance with embodiments of the presently disclosed technology.

FIG. 3A is a schematic drawing of a PZT ultrasonic transducer measurement in accordance with embodiments of the presently disclosed technology. In some embodiments, dual element PZTs (e.g., a dedicated vibrating crystal 10-T as a transmitter (TX), combined with a dedicated vibrating crystal 10-R as a receiver (RX)) are used to reduce the "dead zone" for measuring thicknesses of a relatively thin sample.

In operation, the transmitting and receiving elements should be mutually acoustically isolated, for example by backing material 12, to reduce leakage of ultrasonic waves during the initial pulse. In some embodiments, the reflected waveform 16R is acquired by an analog-to-digital (A/D) converter 40, which may have a programmable data acquisition rate. Operation of the ultrasonic system and/or the A/D converter may be controlled by a controller 30.

Figure 3B:
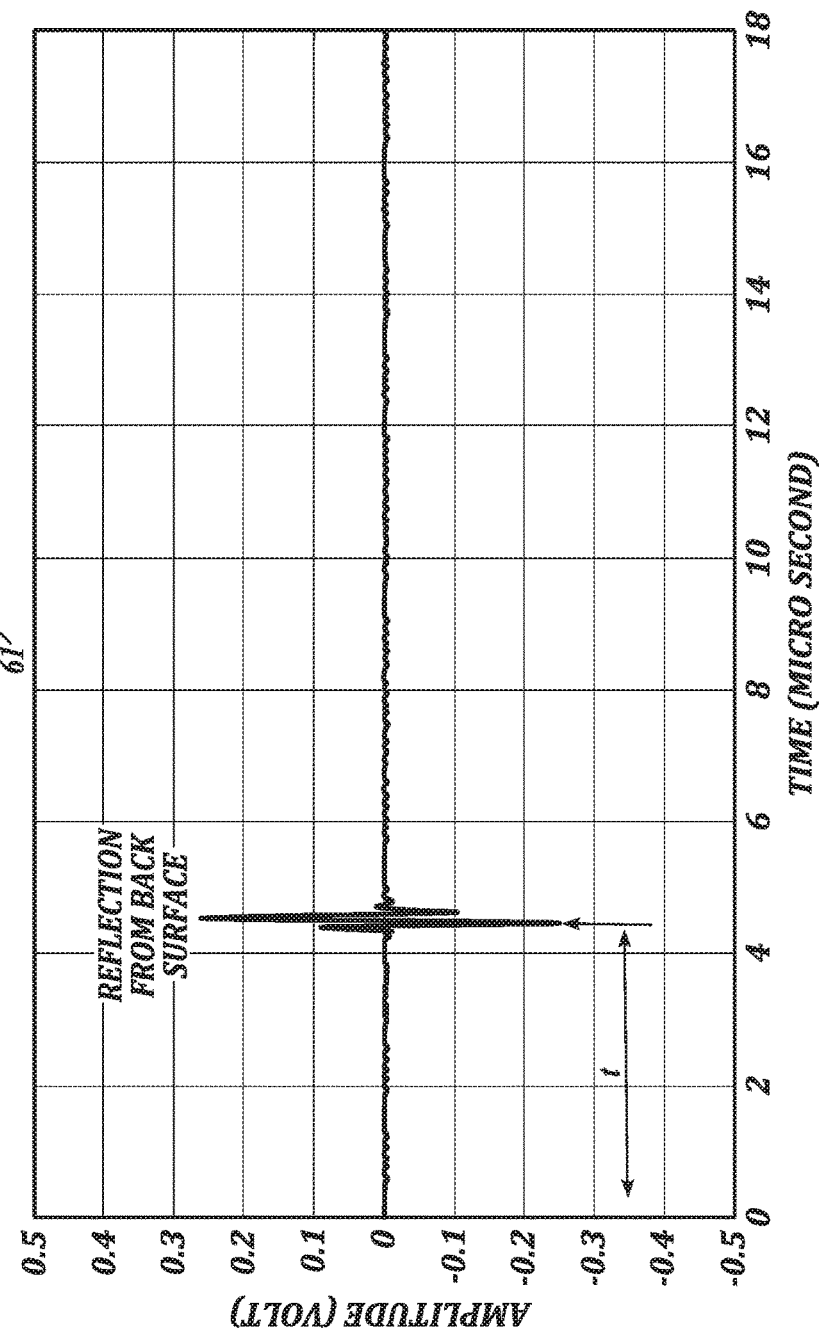
FIG. 3B is a graph of transducer signal obtained using the system of FIG. 3A.

FIG. 3B is a graph of transducer signal obtained using the RX side 12-2 of the transducer of FIG. 3A. Generally, the two sides of the transducer 15 cannot be completely isolated from each other and some of the acoustic waves travel directly from the transmitting element to the receiving element. Thus, a dual element transducer also has a "dead zone" (initial pulse), but the dead zone is significantly smaller than the one illustrated in FIG. 2B. The thickness of a sample may be determined using equation (3) below.

$$D = \frac{t \times v}{2} \tag{3}$$

However, measuring the travel the time "t" can still be difficult, because the zero time is difficult to define. Therefore, the transducer needs to be calibrated prior to measuring material thickness.

Reducing Dead Zones Using Delay Lines

Figure 4A:
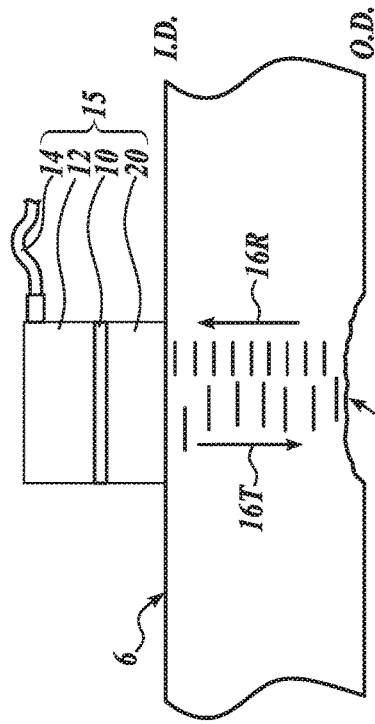
FIG. 4A is a schematic drawing of a PZT system measurement in accordance with embodiments of the presently disclosed technology.

FIG. 4A is a schematic drawing of an ultrasonic system measurement in accordance with embodiments of the presently disclosed technology. The illustrated ultrasonic system 15 includes a delay line 20 that is inserted between the vibrating crystal 10 and the sample 6. A layer of couplant (not shown) transfers vibrations between the delay line 20 and the sample 6. In operation, the initial pulse from vibrating crystal 10 travels through the delay line 20, thus delaying the time between the initial pulse and the first reflection from corrosion 61 at the back wall of the sample 6.

Figure 4B:
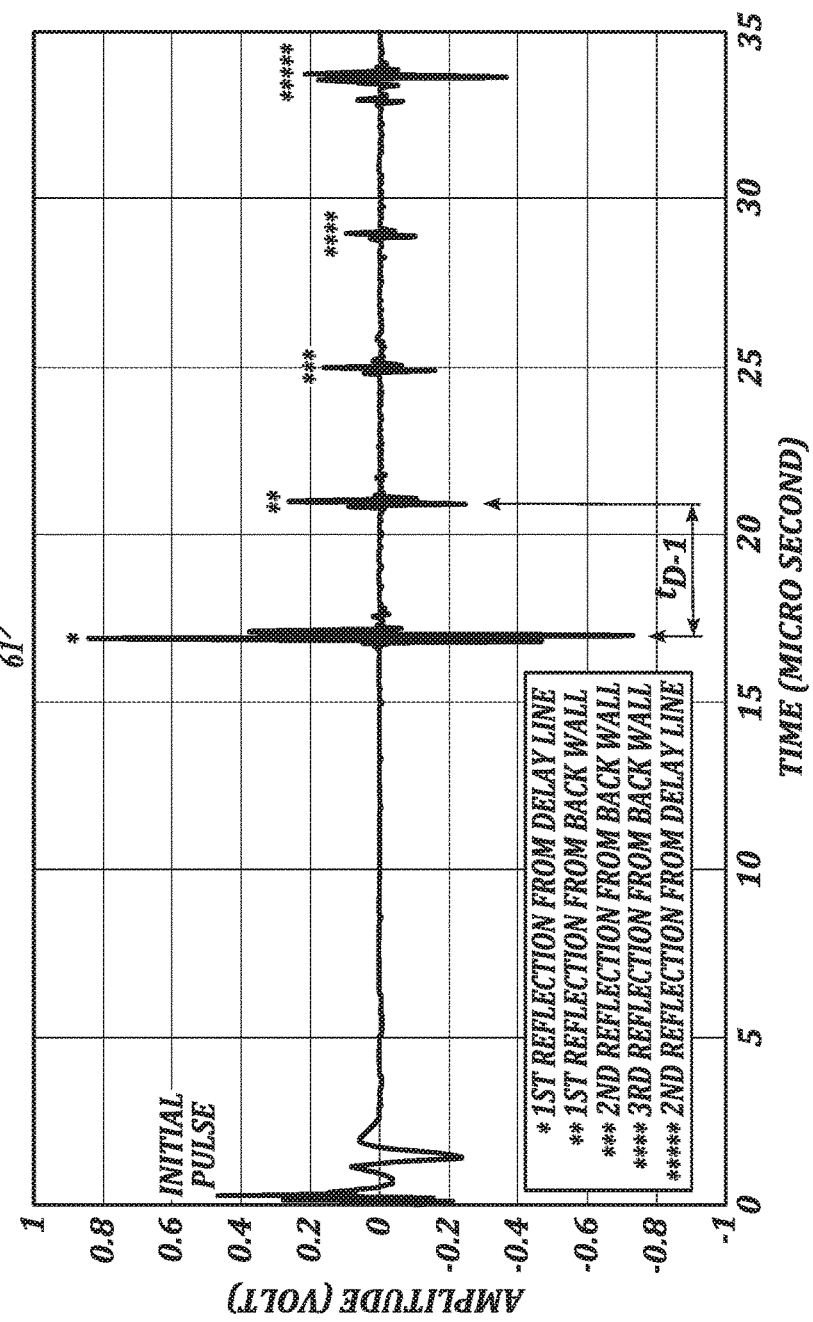
FIG. 4B is a graph of transducer signal obtained using the system of FIG. 4A.

FIG. 4B is a graph of transducer signal obtained using the system of FIG. 4A. The first signal in the illustrated waveform is the initial pulse. Next, because the ultrasonic waves travel through the delay line, the ultrasonic waves are reflected from the interface between the delay line and the sample. After the $1^{st}$ reflection from the delay line, the ultrasonic waves reflect several times from the sample's back wall (reverberation of ultrasonic waves between front and back walls of the sample). To determine the sample's thickness, the time between $1^{st}$ reflection from the delay line and $1^{st}$ reflection from the back wall can be measured ($t_{D-1}$). To calculate the thickness of the sample, the following equation can be used:

$$D = \frac{t_{D-1} \times v}{2} \tag{3}$$

As can be seen from FIG. 4B, due to the time delay caused by the signal travel through the delay line 20, the $1^{st}$ reflection from the delay line 20 is less likely to be contaminated by the initial pulse, making the $1^{st}$ reflection from the delay line a more reasonable reference for measuring time delay to other reflections, for example to $1^{st}$ reflection from the back wall. Furthermore, the duration of the "$1^{st}$ reflection from delay line" is generally shorter than the duration of the initial pulse, therefore providing for a more precise reference point in time. For example, the duration of the "1st reflection from delay line" is around 0.7 microsecond (corresponding to about 2 mm thickness of the pipe) compared to the duration of the initial pulse, which is around 3 microseconds (corresponding to about 9 mm thickness of the pipe).

Measuring the time between the 1st reflection from the delay line and the 1st reflection from the back wall ($t_{D-1}$) may be difficult. Generally, these two waveforms may lack similar features to compare for the time measurement. Therefore, the device should be calibrated before being used to obtain accurate thickness measurements.

Accuracy and Error Analysis

Accuracy and Sources of Errors in Ultrasonic Thickness Measurement

Generally, the accuracy of ultrasonic thickness measurement is in 100 s of microns. Such accuracy may be acceptable to the operators of equipment in oil, gas and petrochemical industries, because the process of corrosion is not very fast and operators can take corrective actions long before the thickness of a part reaches a critical point. Measuring thickness with an accuracy of ±0.1 mm is quite adequate for corrosion management. However, if the corrosion rate must be determined within a short measurement time for a location in a piece of equipment, more accuracy is required. As previously described, an accuracy of ±10 microns or better may be needed to determine the corrosion rate within a few weeks or months.

In some embodiments, accuracies in 10 s of microns are difficult to achieve with ultrasonic thickness measurement because of the difficulty of accurately measuring the time between different signals in a waveform. For example, the initial pulse signal that determines the zero time (t=0) is set by the trigger level in an instrument. Zero time is an arbitrary location in the initial pulse and can be changed by the trigger level. Furthermore, measuring the time for the signal to reflect should be accompanied with measuring the beginning of that signal. The beginning of a signal is difficult to pinpoint and is generally set to when the signal crosses over a threshold. That threshold is also somewhat arbitrary and is often selected based on operator's judgment. In general, whenever the time difference between two dissimilar signals is measured, that measurement has some inherent inaccuracies.

To eliminate this arbitrary determination of the beginning of a signal, two similar signals are used in some embodiments. As shown in FIG. 4B, determining the travel time of ultrasonic waves between front and back surfaces of a sample measures the time between the 1st and 2nd reflections. In many practical embodiments, these two signals are fairly similar. Therefore, by measuring two corresponding points between them, a relatively accurate time difference can be measured. For example, in FIG. 4B the time between 1st and 2nd reflections ($t_{1-2}$) is measured between the minimum amplitude points of these two signals. Although this kind of measurement produces better accuracy, it is not error free. As ultrasonic waves travel in the sample, the beam diffracts. Diffraction-driven attenuation, a function of frequency, affects higher frequency signals more than lower frequencies. Thus, the general shape of a signal continuously changes as it travels in a material. Consequently, measuring the time difference between two corresponding points of two signals can also generate some inaccuracies.

The next source of error is digitization error. Most modern thickness gauging equipment is digital and the waveforms are defined as a collection of discrete points. The time between two discrete points can be a source of error. Most thickness gauge equipment uses a 10-100 MHz digitizer to capture ultrasonic waveforms. Even at a digitization rate of 100 MHz, the time between two consecutive measurement points is 0.01 micro-seconds. In carbon steel, this measurement error produces a distance uncertainty of about 60 microns. This error can be reduced with a higher digitization rate, but higher frequency digitizers are more costly and may be less practical to use in the field.

There are other sources of error that produce uncertainties in thickness measurements. Electronic noise, like jitter in the waveforms, can also cause errors in the time measurements. In some embodiments, averaging can help to make the waveform more stable and to reduce some of the electronic errors.

Estimates of Errors

Knowing the sources of errors helps in predicting the amount of inaccuracies generated by each source. Generating budgetary estimates of the total errors helps ensure the reliability of test results. The following values provide some estimates of expected errors:

| | |
|---|---|
| Micrometer Measurement | ±5 microns (≈0.2 mils) |
| Temperature variation (±5° C.) | ±1 microns |
| Digitization error (5 GHz) | ±1 microns |
| Electronic noise and waveform jitter | ±5 microns (no averaging), ±3 microns (64 averaging) |
| Total | ±12 microns (no averaging), ±10 microns (with 64 averaging) |

A rough estimate of errors shows than an accuracy of ±10 microns can be achieved in some embodiments of the corrosion rate measurement. This amount of error may be acceptable for estimating corrosion rate.

Corrosion Measurements

In some embodiments of the present technology, the corrosion rate is measured over a period of a few weeks or months instead of years. The time that is required to determine a fairly accurate corrosion rate depends on the severity of the corrosion as described in Table 1. For example, severe corrosion can be measured in 2-3 weeks and a low corrosion rate may need 2-3 months.

In one embodiment, the thickness of the pipe (at a given location) can be measured at two different times and the difference in the two thicknesses divided by the time interval between the two measurements can determine the corrosion rate.

$$\text{corrosion rate} = \frac{\text{thickness at time 1} - \text{thickness at time 2}}{\text{time 2} - \text{time 1}} \quad (4)$$

In another embodiment, the corrosion rate is determined by measuring the change in thickness directly (without measuring the thickness), and then dividing the change in thickness by the time period over which the change occurred.

$$\text{corrosion rate} = \frac{\text{change in thickness between time 1 and time 2}}{\text{time 2} - \text{time 1}} \quad (5)$$

In some embodiments of inventive technology, thickness is measure as shown in Equation (5). Such procedure achieves accurate measurement of the time shift by using similarities in the shape of reflected signals.

Precision Corrosion Rate Measurements

In an exemplary implementation of the procedure, there are six steps to determine relatively small changes in the thickness of pipe. Some of these steps may be rendered more accurate with analytical or computation refinements, as described below.

Step 1:

In some embodiments, a single element transducer with a delay line (as shown, for example, in FIG. 4A) may cause long enough delay in the signal such that the reflected ultrasonic wave from its end is separated from the initial pulse of the transducer. In an embodiment, the transducer (e.g., the PZT 15) has a wide frequency band with a central frequency in the range of 1 to 15 MHz. Lower frequencies may also be used, as they generally work better for larger thicknesses or materials with higher attenuation. Generally, high frequency transducers work better for thin pipes or metals with low attenuation.

As explained before, delay lines are mostly used to reduce the "dead zone" of a transducer. However, in this step the delay line also provides a reference signal to help perform accurate measurements.

In one embodiment, the transducer is driven with a transmitter (TX)/receiver (RX) in pulse/echo mode (transmit/receive mode). Higher signal digitization rates improve the accuracy of results, but also tend to cost more. In some embodiments, a waveform digitization rate of 50 MHz is used to produce more accurate results.

Step 2:

In some embodiments, the transducer (e.g., the PZT 15) is placed on the sample 6 at the location where the corrosion rate is to be measured. The transducer may be affixed to this location during data collection, because movement of the transducer during the data collection period can introduce errors in the final result. The transducer may be affixed with a coupling medium that will allow the ultrasonic waves to travel from the delay line into the material. Since the transducer will be fixed at a location for a period of time, for example, several weeks, a long-term adhesive capable of transmitting ultrasonic waves, such as 5-minute epoxy, may be used.

Step 3:

Full waveform data are collected at different time periods. In some embodiments, collecting multiple sets of waveform data in each period improves the accuracy of the corrosion rate measurement. In some embodiments, a recording of at least one waveform per week is recommended. The recorded waveform should contain at least the first reflection from the end of the delay line and the first reflection from the back wall of the sample (as shown in FIG. 4B). In some embodiments, collecting multiple sets of waveform per-data period allows the data to be averaged. Averaging the data may reduce jitter and other inaccuracies in the waveform. In some embodiments, the waveform data are averaged before being stored.

The temperature of the metal may be measured at the same time as the waveform data is collected to reduce measurement errors. The waveform data, date and time of data collection, and temperature of the metal may be stored and recorded for further signal processing.

Figure 5A:
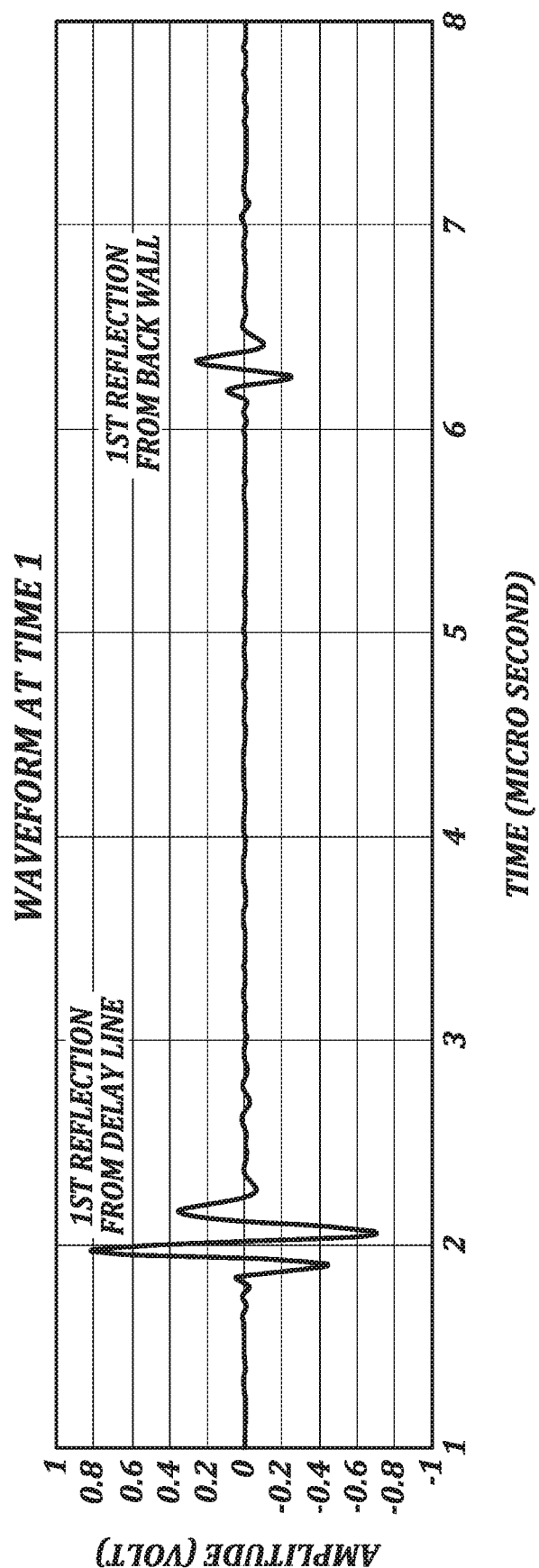
FIGS. 5A and 5B are graphs of transducer signal in accordance with embodiments of the presently disclosed technology.
Figure 5B:
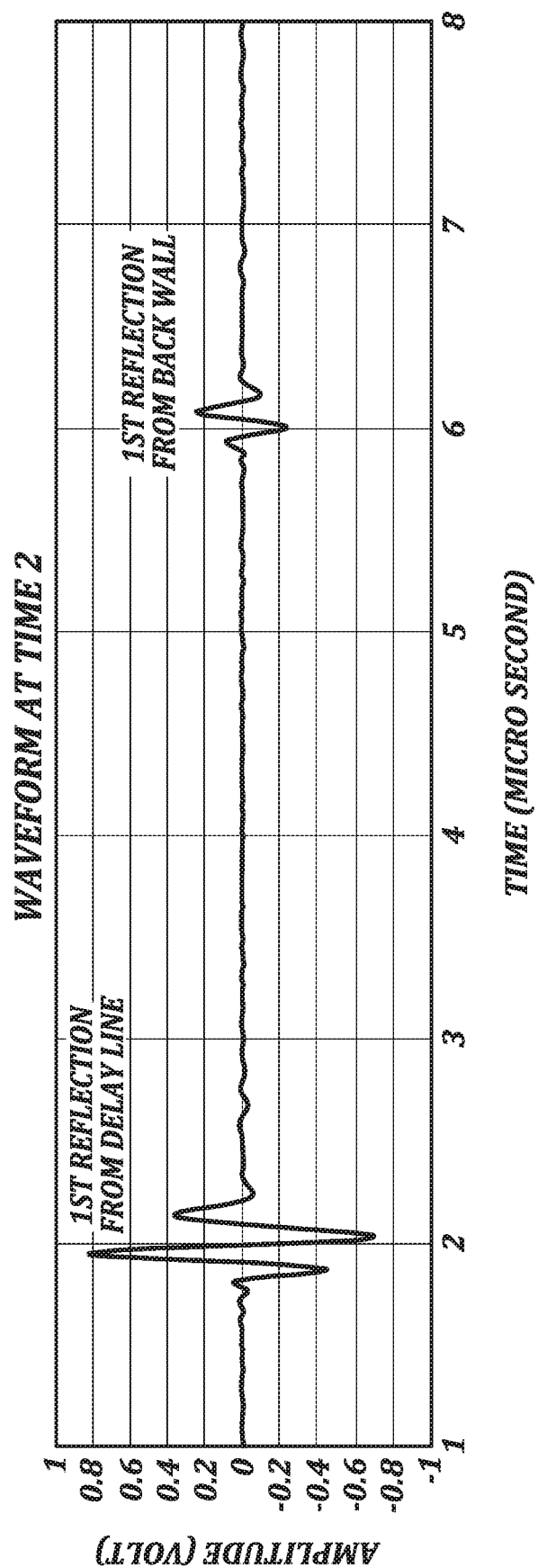

FIGS. 5A and 5B are graphs of transducer signal in accordance with embodiments of the presently disclosed technology. For both graphs, the horizontal axis represents elapsed time in microseconds, and the vertical axis represents signal amplitude in volts. Difference between Time 1 (FIG. 5A) and Time 2 (FIG. 5B) may be several weeks. Therefore, between Time 1 and Time 2 the thickness of the sample has been reduced by a certain amount because of the progress of corrosion. In both Figures, the first signal is the reflection from the delay line and the second signal is the reflection from the back wall of the sample. In general, an accurate determination of the difference between Time 1 and Time 2 improves accuracy of the determination of the rate of corrosion progress.

Step 4:

Measuring the time shift of the first reflection from the back wall between Time 1 and Time 2 provides the information needed to calculate the change in thickness. Superimposing the two waveforms on top of each other allows the time shift of the back wall reflection to be observed.

Figure 6:
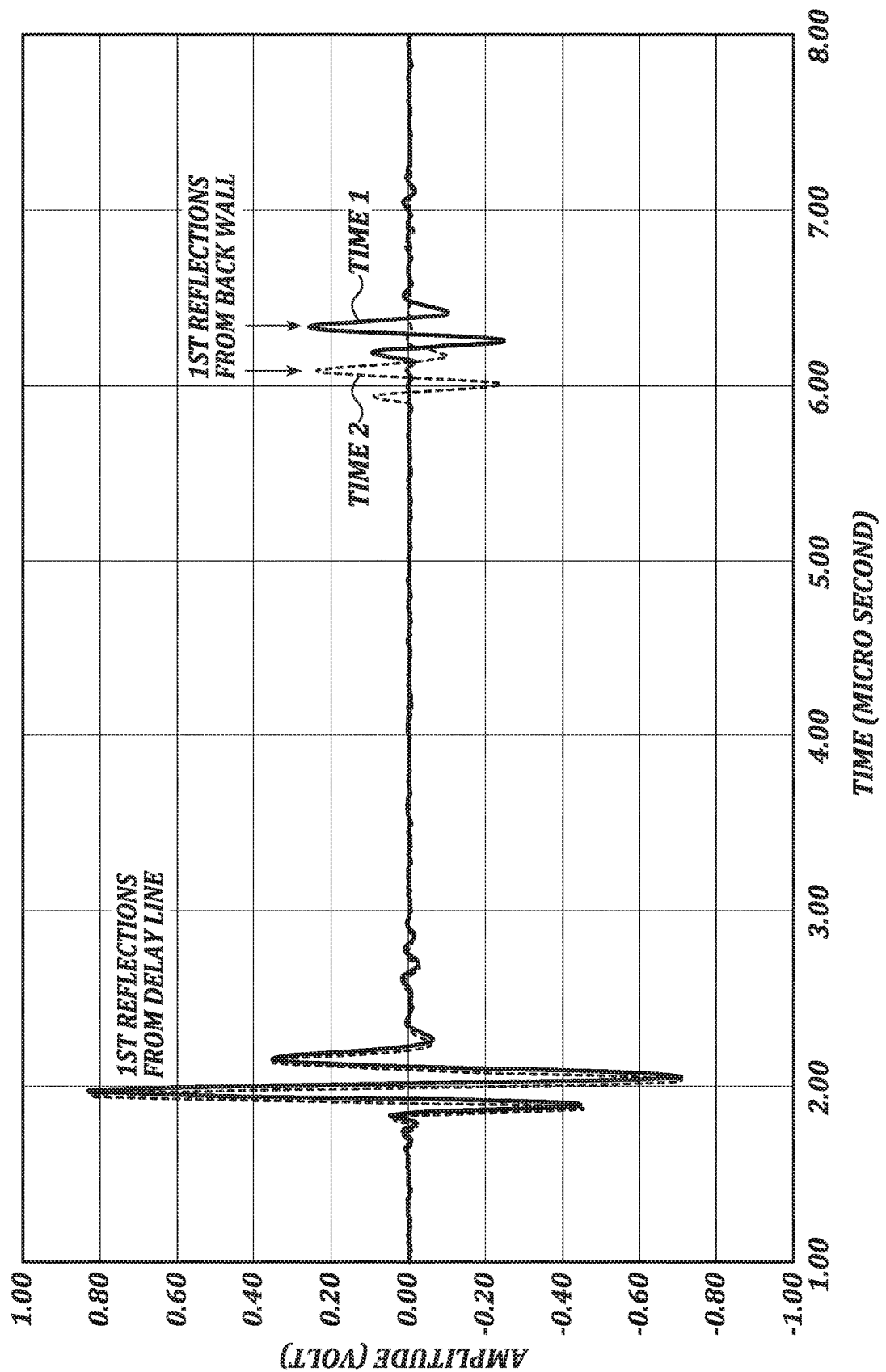
FIG. 6 is a graph of an overlay of transducer signals in accordance with an embodiment of the presently disclosed technology.

FIG. 6 is a graph of an overlay of transducer signals in accordance with an embodiment of the presently disclosed technology. FIG. 6 shows the two waveforms from FIGS. 5A and 5B superimposed on each other. The reflected signals from the back wall are generally similar and their time difference can be measured between two corresponding points in the waveform. In the illustrated embodiment, the corresponding maximum amplitudes of each reflected signal from the back wall are determined and the time difference between them is measured. The choice of maxima is merely illustrative; other corresponding extrema or inflection points between the two reflected signals from the back wall may be used.

Figure 6A:
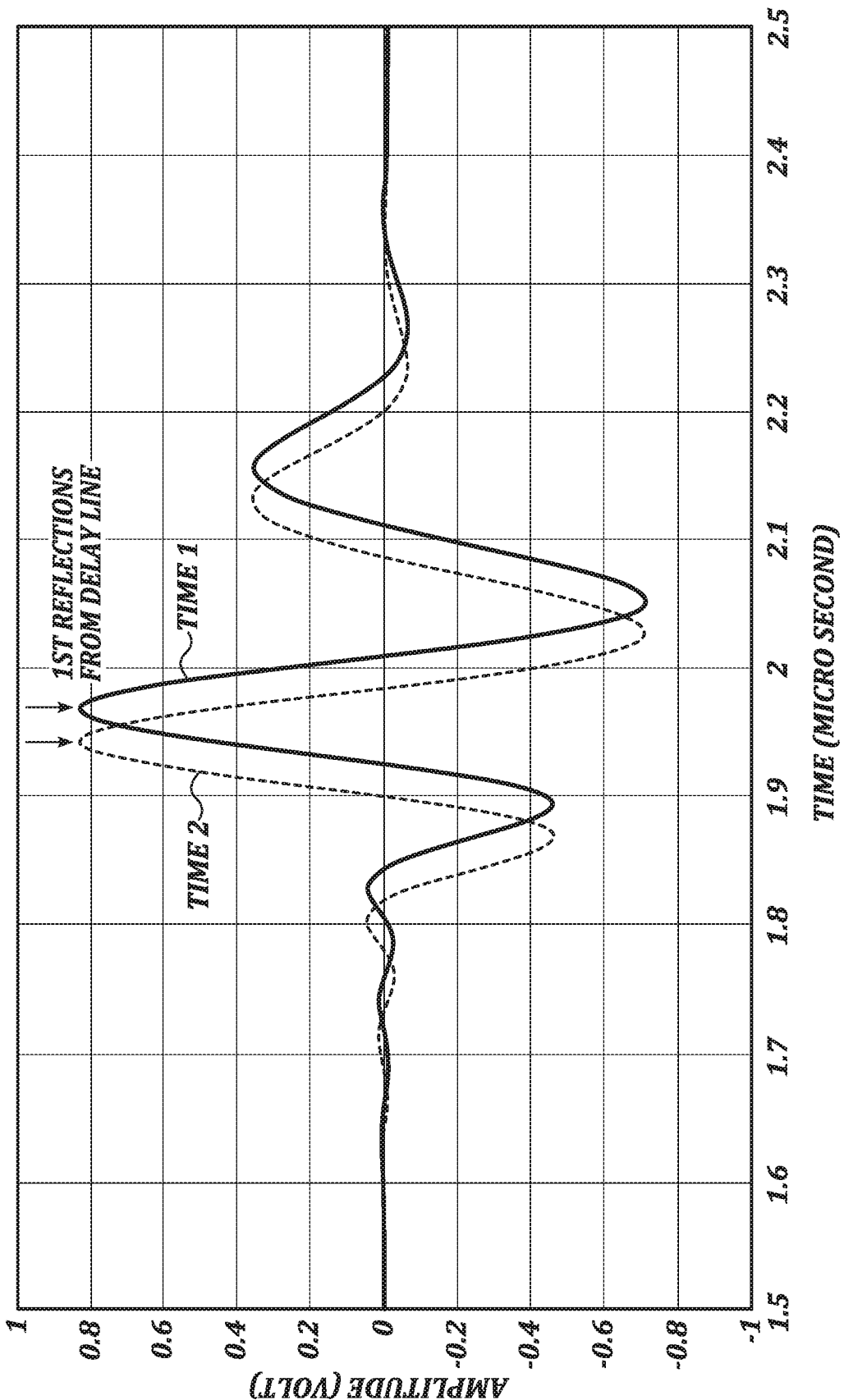
FIGS. 6A and 6B are details of the first reflections of the graph shown in FIG. 6.
Figure 6B:
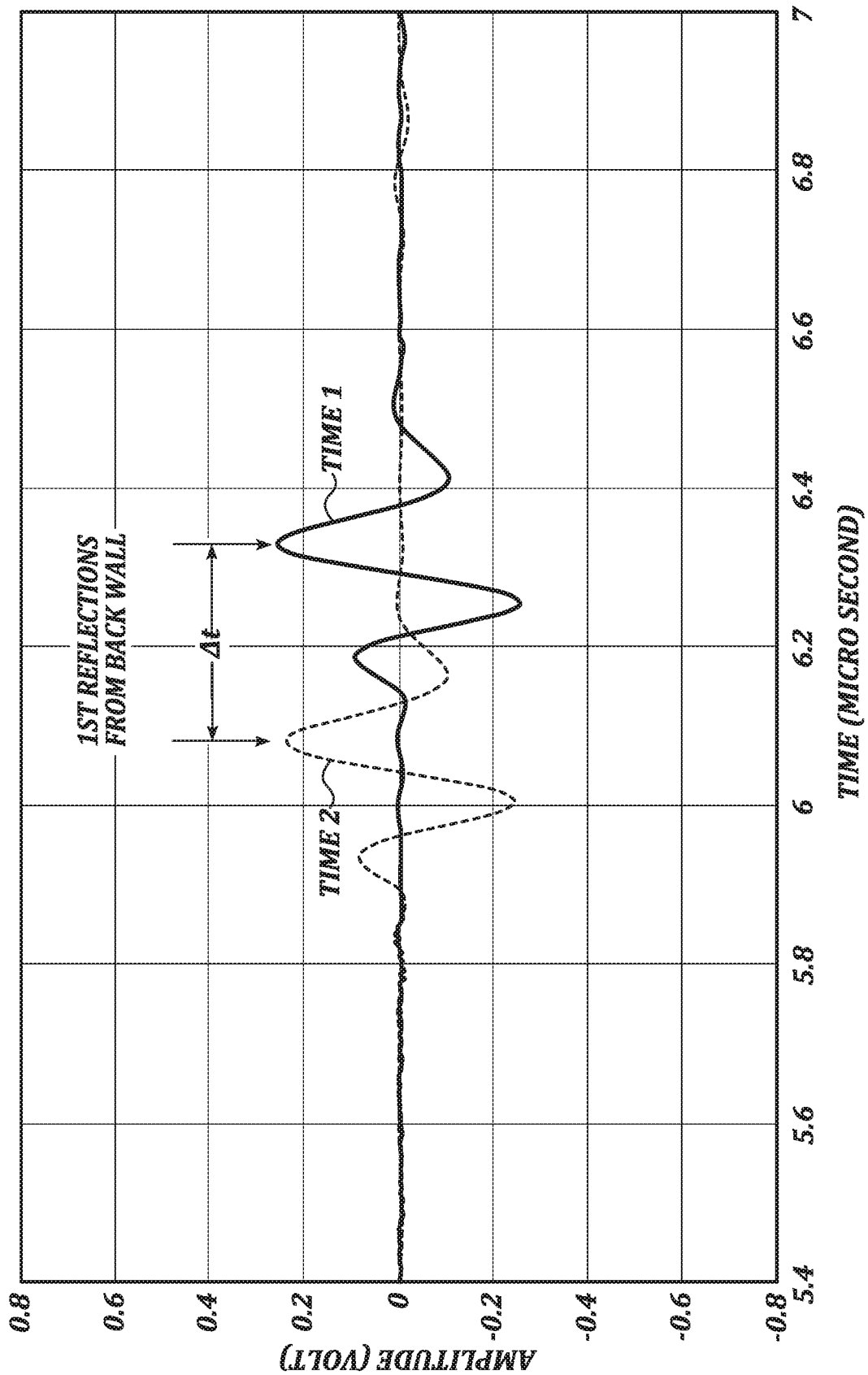

FIGS. 6A and 6B are details of the first reflections of the graph shown in FIG. 6. In general, the reflected signals from the delay line at Time 1 and Time 2 should not shift, because the delay line should not change between data collection times. However, due to electronic noise, temperature change or other factors some time shift may occur from Time 1 to Time 2.

FIG. 6A shows magnified $1^{st}$ reflections from the delay line and their slight misalignment. Under normal use, the delay line is not subject to any appreciable corrosion, and it serves to establish a reference delay in the return signal. Because the method depends on a common origin for measurements, the two waveforms should be adjusted to ensure that the two reflected signals from the delay line are overlapping before calculating the change in travel time. Therefore, in this step, the two waveforms are shifted in a way that the reflected signals from the delay line become aligned.

As discussed above, the delay line produces a reference signal to align waveforms captured at different times. Aligning the signals for "$1^{st}$ reflection from delay line" compensates for changes in the transducer or delay line due to temperature, electronics or other factors maintaining changes in other waveforms corresponding to changes in the sample being measured (including thickness reduction, temperature change, etc.), and it improves accuracy.

The two arrows in FIG. 6A indicate the corresponding maximum amplitudes of the two signals. The two waveforms may be synchronized by temporally shifting one of the waveforms so that the maximum amplitudes (or other corresponding extrema) match for the portion of the wave created by the reflection from the end of the delay line. The maximum amplitude of each reflected signal from the end of the delay line can be determined from the two waveforms, but because the waveforms are discrete, the time of the maximum amplitude may not be determined very accurately. Therefore, several additional procedures can improve the accuracy of the time difference measured between any two corresponding points of the two signals, as described below.

Step 5:

After aligning the signals, the time difference between the reflections from the back wall can be measured. Again, the time of local maxima are used to measure the time difference between the two similar, but discrete, waveforms. FIG. 6B shows magnified $1^{st}$ reflections from the back wall and their slight misalignment after the two waveforms have been synchronized. In the illustrated embodiment, the time difference is determined between the maximum points. In other embodiments, other local extrema, inflection points, points of first zero crossing, etc., may be used instead. The locations of the points of maximum signal in these two reflections can be found from the discrete waveforms. The time difference between these two maximum points in the aligned waveforms is the time shift corresponding to thickness reduction ($\Delta t$) caused by corrosion.

Step 6:

The time shift $\Delta t$ determined in step 5 can be used in this step to calculate thickness loss $\Delta D$:

$$\Delta D = \frac{\Delta t \times v}{2} \qquad (6)$$

where v is the speed of sound in the metal being measured. The speed of sound in a material is generally temperature-dependent, so the speed of sound used in the equation should be adjusted based on the temperature that was recorded during data collection. Alternatively, the speed of sound in a sample of metal of known dimensions can be measured at different temperatures. Collecting the waveforms under the same temperature conditions (e.g., within a few degrees) reduces a need to adjust the data temperature variation.

Accurate Time Difference Measurement Techniques Between Two Signals

The Steps 4 and 5 described measuring the time difference between two signals. Accurately measuring the time difference between two discrete signals may be difficult. For example, to determine the time difference, first the two corresponding points in the two signals must be chosen. In the discussed examples, the maximum point of each signal is considered for the time difference measurement, but other points may also be used, for example, local extrema, inflection points, points of first zero crossing, etc.

Figure 7:
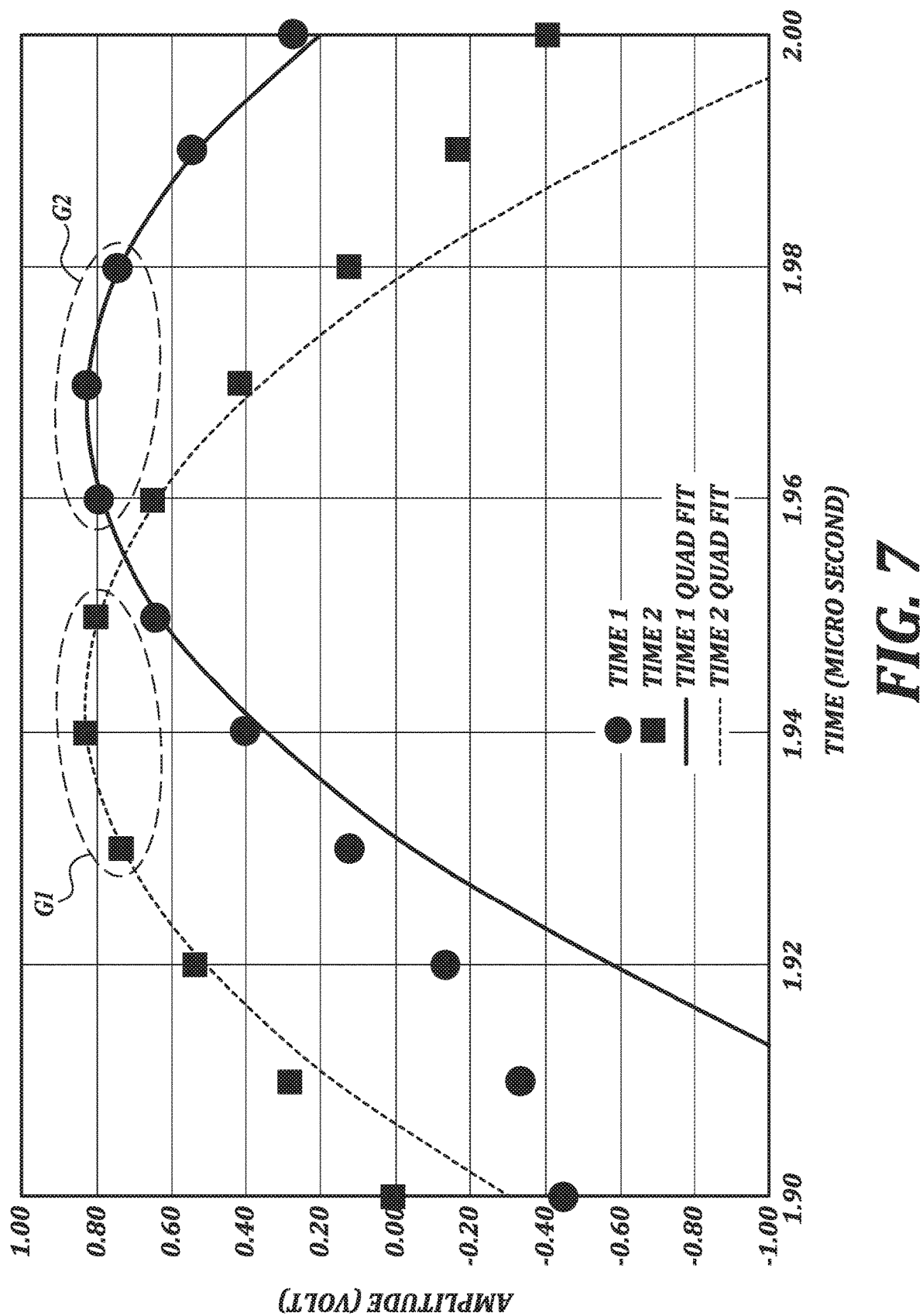
FIG. 7 is a graph of a quadratic curve fit through transducer data in accordance with embodiments of the presently disclosed technology.

FIG. 7 is a graph of a quadratic curve fit through transducer data in accordance with embodiments of the presently disclosed technology. The waveforms are recorded as discrete point because of the analog to digital (A/D) conversion. Therefore, precise location of the maximum points may not exactly correspond to one of the recorded (digitized) points. For example, consider the two reflections from the end of the delay line depicted in FIGS. 6A and 6B. FIG. 7 shows the same two reflected signals (shown by symbols in the graph) from the end of the delay line in the vicinity of their maximum signals (between 1.9 to 2 microseconds). Precisely determining the actual maximum for these discretely measured waveforms (G1 for the signal at Time 1, and G2 for the signal at Time 2) may be difficult, because the time between each sample point is only 0.01 microsecond (with the 100 MHz sampling rate). In some methods, the location of the maximum points may be determined more accurately by approximating these discrete waveforms with a continuous wave. The following sections describes several embodiments of approximating discrete measured waveforms with a continuous wave.

Parabolic Curve Fitting

In one embodiment, three points are selected in the vicinity of the selected extrema (in this case the maximum points), and parabolas are fit through the points using a quadratic equation. The two circled regions G1, G2 in FIG. 7 show the groups of three points for fitting quadratic equations. The line graphs in FIG. 7 show the quadratic curve fits for the two waveforms. As these curves show, the quadratic fits also pass through a few more adjacent points.

For the illustrated embodiment, the quadratic fit shows the maximum signals occur at:

x=1.967903 for Time 1 and x=1.942500 for Time 2

In the above example, the time should be shifted by 0.025403 microseconds to align the reflections from the end of the delay line. Therefore, one of the waveforms ($1^{st}$ reflections from delay line) may be shifted in time to align the two waveforms (signals).

Figure 8:
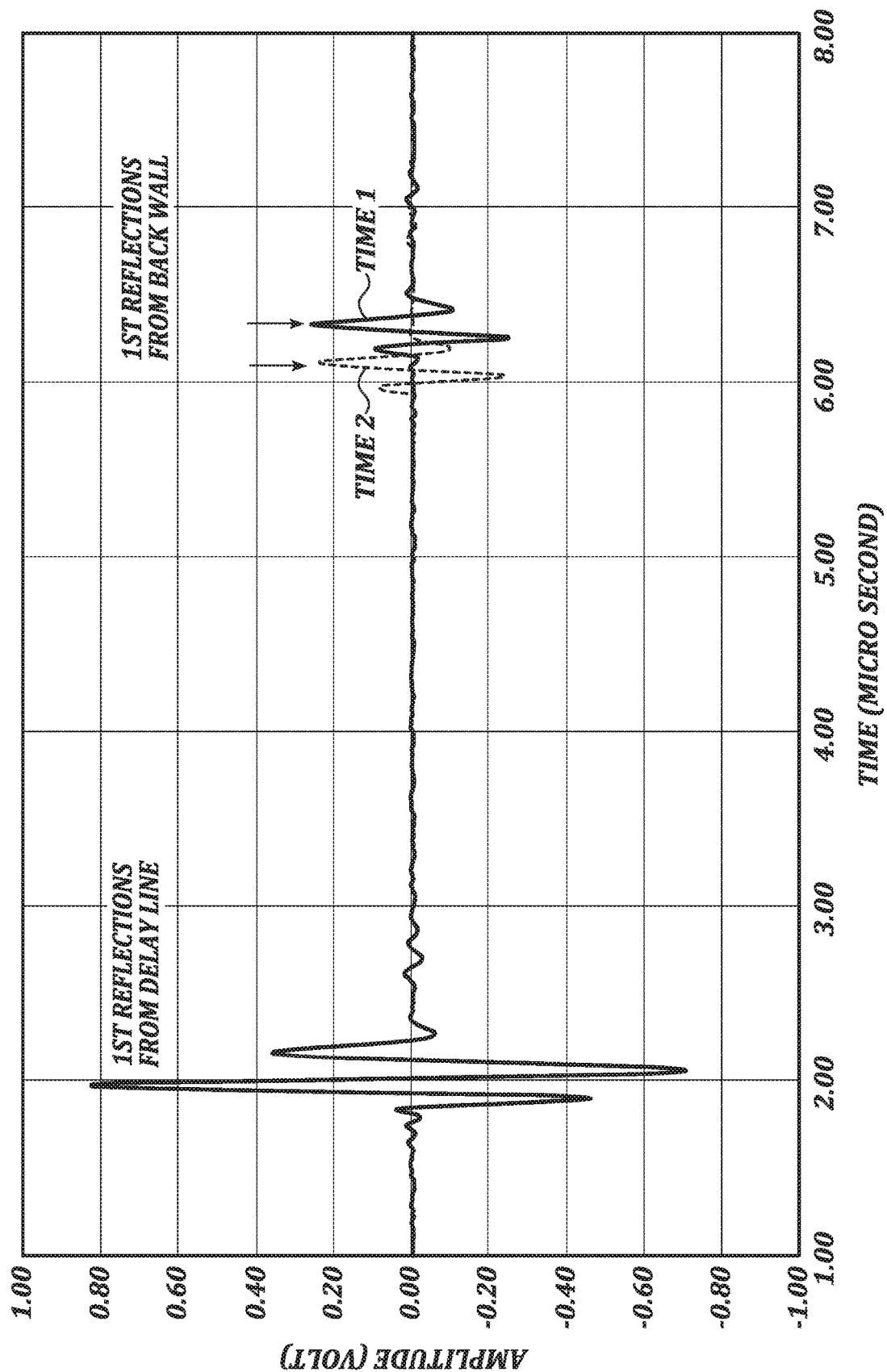
FIG. 8 is a graph of an overlay of transducer signals in accordance with an embodiment of the presently disclosed technology.

FIG. 8 is a graph of an overlay of aligned transducer signals in accordance with an embodiment of the presently disclosed technology. A comparison of FIGS. 6 and 8 shows the effect of the alignment.

In the embodiment shown in FIG. 8, the parabolic fit indicates that a shift of 0.0254 microseconds is needed to align the two reflected signals from the end of the delay line. The adjustment of 0.0254 microseconds corresponds to about 75 microns in pipe thickness. Therefore, if the original discrete waveforms were used to determine the misalignment of these two reflections from the end of the delay line, it would yield a misalignment of 0.03 microseconds. Thus, the parabolic fit yielded an improvement in the final result for the pipe thickness of about 14 microns. Therefore, such adjustments are useful to improve accuracy of the pipe thickness measurements.

The parabolic fit may be performed in Step 5 to also determine the time difference between the first reflections from the back wall. This fitting procedure is computationally efficient method to achieve more accurate measurements between two corresponding points of two signals. Other, more computationally intense curve fitting procedures can generate even more accurate results. The following procedures briefly describe some of these curve fitting methods.

Nth Degree Polynomial Curve Fitting

Parabolic curve fitting uses only three points in the vicinity of the selected feature in the signal. However, other curve fitting techniques can be used to locate features of a signal (such as extrema) more precisely. In some embodiments, higher order polynomials that provide curves that best fit through higher number of points may be defined using the least squares method. An nth degree polynomial has the form of:

$$y = a_0 + a_1 x^1 + \ldots + a_n x^n$$

Using the least squares method, the coefficients of the above polynomial ($a_0, \ldots, a_n$) that best fit the selected data points can be determined. The degree of the fitted polynomial generally does not exceed the number of data points used minus one. After determining the coefficients of the polynomial, points of interest on the curve can be found from the polynomial. In the illustrated example, the point of maximum amplitude was used as a point of reference, but other points of interest are also possible, for example, the minimum, an inflexion point, etc.

To find the time of maximum amplitude, the first derivative of the polynomial with respect to x is equated to zero and its n roots are determined. The roots of the equation are the points of extrema of the polynomial. The root that falls within the range of the selected points corresponds to the maximum point.

In an illustrative embodiment in FIG. 8, a fifth degree polynomial is used to find the best fitted curve for the reflection from the delay shown in FIG. 7. Analogously to the quadratic curve fit, the goal was to find the maxima of the reflected signals from the delay line and measure the time difference between these two signals at Time 1 and Time 2.

Figure 9:
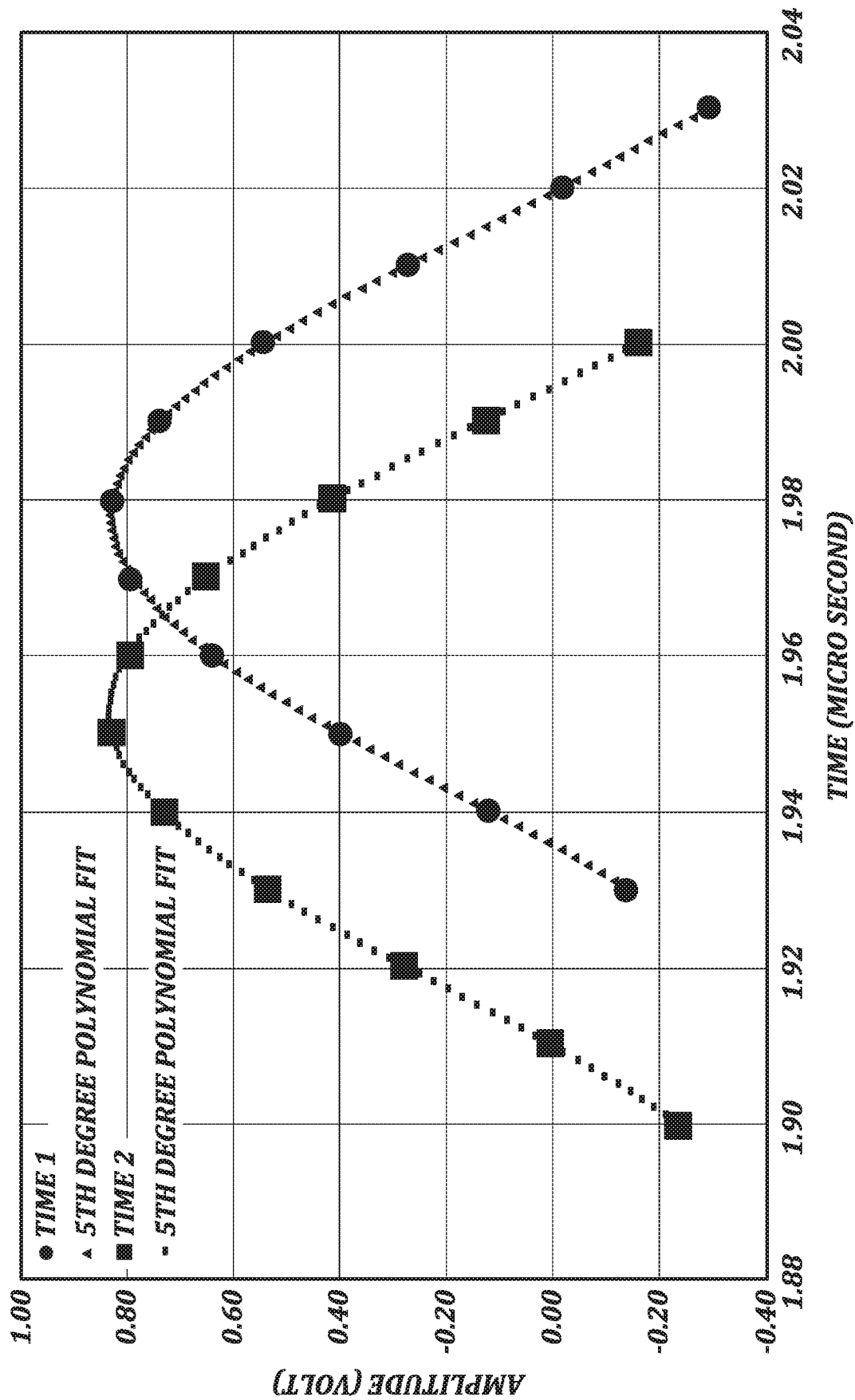
FIG. 9 is a graph of a polynomial curve fit through transducer data in accordance with embodiments of the presently disclosed technology.

In one embodiment, the maximum amplitudes of the two signals were selected as points of reference. The 5 points before and after each of the maxima were selected to provide points for a $5^{th}$ degree polynomial to pass through. FIG. 8 shows the original signals from Time 1 and Time 2 and the results of the best fit using the $5^{th}$ degree polynomials. Compared to FIG. 6, FIG. 9 shows that a higher order polynomial passing through more points can approximate the original signal better than a simple parabola ($2^{nd}$ degree polynomial) passing through only 3 points. Also, the results in FIG. 8 show the best fit curves pass through all the selected points. In the illustrated embodiment, the $5^{th}$ degree polynomial determined a time difference of 0.025 microseconds between the $1^{st}$ reflections at Time 1 and Time 2, which is close to parabolic measurement. In general, increasing a degree of the polynomial fit and the number of points increases both the accuracy of the fit and the computational effort.

Resampling Waveforms Using Higher Sampling Rate

In some embodiment, an additional improvement in determining more precise locations of selected points in a discrete curve is to resample the curve with higher sampling rate. Populating the discrete curve with more points reduces the discretization error. This technique is especially useful when the exact and continuous analytical form of the interpolated curve is complex or unavailable. In the previous example a $5^{th}$ degree polynomial was found so that the coordinate of the maximum point could be determined. As mentioned before, the roots of the first derivative of the polynomial can be found and used to determine the coordinates of extrema.

In other embodiments, the maximum (or any selected points) may be determined by evaluating polynomial in the range of the selected points using very fine, discrete points. This makes finding the time corresponding to the maximum value of the polynomial simple. The accuracy of the result depends on the fine-ness of selected discrete points. This technique is based on resampling a portion of the waveform with a higher sampling rate, therefore reducing the digitization error. For example, the reflected signals from the end of the delay line ($1^{st}$ reflected signal from the delay line) may be resampled in the vicinity of its maximum.

To illustrate this improvement, in some embodiments the original signal was recorded with a 100 MHz sampling rate. After determining a $5^{th}$ degree polynomial as described above, the polynomial was resampled in the vicinity of the maximum with higher sampling rates. Since the $5^{th}$ degree polynomial fit is a continuous function, the sampling rate is essentially limited by the resolution accuracy of the computer. Therefore, this resampling of the $5^{th}$ degree polynomial was performed at 200 MHz, 500 MHz, and 5 GHz sampling frequency. In general, higher sampling rate results in more accurate location of the maximum signal.

Cubic Spline Interpolation

In some embodiments, discrete points obtained by the analog to digital (A/D) conversion are approximated using a cubic spline fit. A cubic spline is a function defined piecewise by third order polynomials fit through the data points. This technique can pass through the selected points more because the slopes of the cubic splines tend to better approximate the slopes of the approximated real function.

Figure 10:
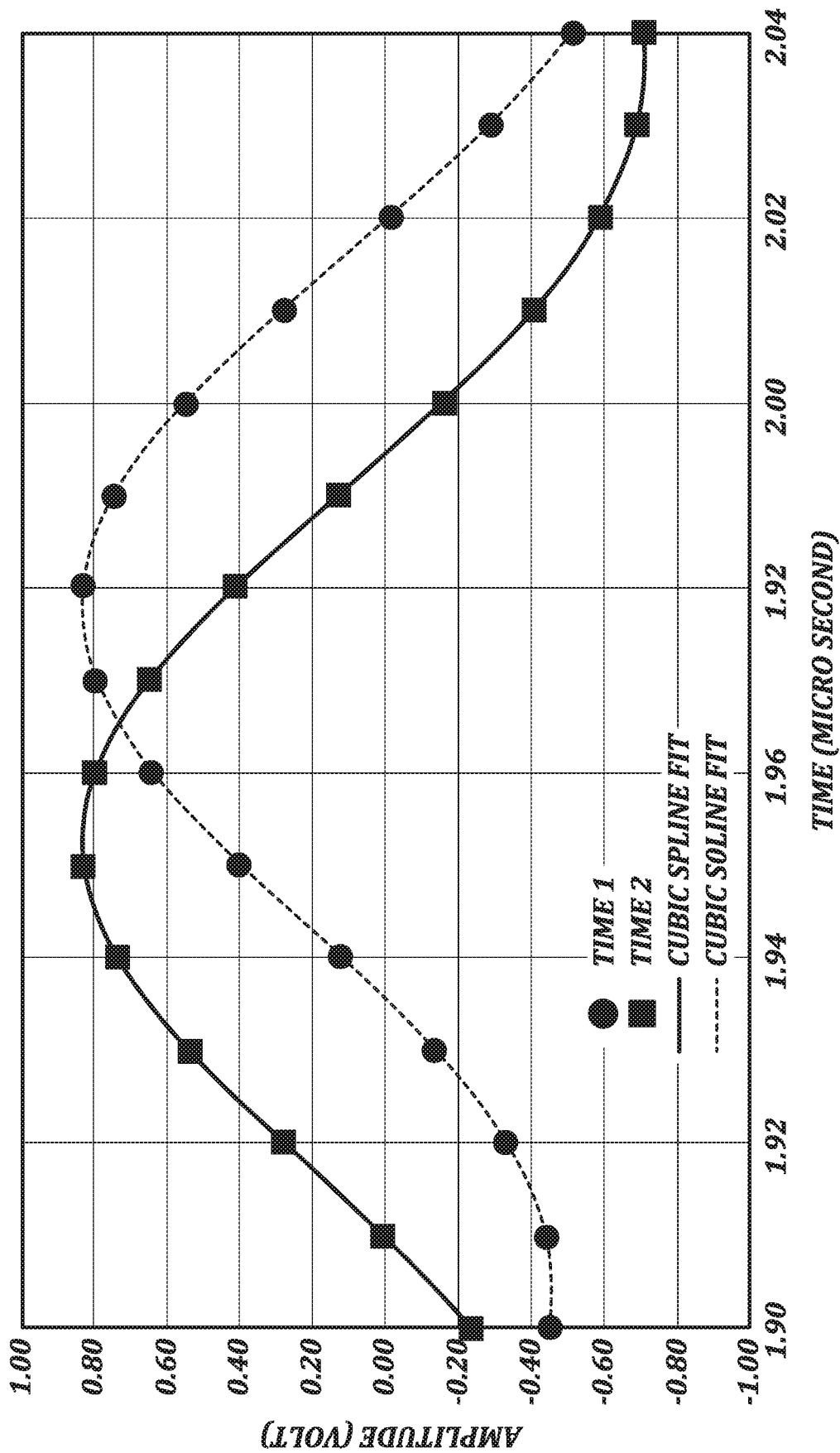
FIG. 10 is a graph of a spline curve fit through transducer data in accordance with embodiments of the presently disclosed technology.

FIG. 10 is a graph of a spline curve fit through transducer data in accordance with embodiments of the presently disclosed technology. FIG. 10 shows the same two reflected signals from the end of the delay line as in the above curve fitting examples. The cubic spline curve fits through many points in the vicinity of the maximum amplitudes. In this example, the cubic spline fit simulated the original signal with a sampling rate 50 times greater than the original. As a result, the cubic spline interpolation identified the time difference of 0.0252 microseconds between these two signals compared to 0.0254 microseconds from a parabolic fit (0.6 microns less than parabolic fit) and 0.0250 microseconds from a 5th order polynomial fit (1.2 microns less than parabolic fit).

Different curve fitting procedures may be used in other embodiments. In this study, only a few of them are mentioned and used. Some of these techniques are computationally intense. However, powerful computers can generate a fairly accurate curve fit through the selected points. These curve fitting routines, as well as others, may be incorporated in computer programs written to determine the time shift between the two signals to properly align the signals.

Other Techniques for Determining Time Difference Between Two Signals in Waveform As explained above, the time difference between two signals may be determined by selecting two corresponding points of the two signals (e.g., the maximum amplitude of the signal), fitting the curves through the groups of points, and determining time offset to align the curves. In general, this technique is suitable for signals having similar shape. However, in practice, the two signals may not have similar shape. For example, the two consecutive reflections from a surface may be similar, but with some differences caused by diffraction of the beam, frequency-dependent attenuation, etc. Therefore, in some embodiments, finding the time difference between the two signals is based on the signals in their average form. An example of such embodiment is based on cross-correlation.

Cross-correlation can find time difference between two signals. By determining the cross-correlation between two signals, the two signals are aligned based on more than just one point. Cross-correlation is a product of two signals as one signal is incrementally moved over the other signal, as represented by:

$$Cr(x) = \Sigma_{n=-\infty}^{\infty} f(n) \times g(n-x) \quad (7)$$

where Cr represents the cross-correlation of two discrete functions $f(x)$ and g(x). The result of cross-correlation is a curve that indicates the alignment of two signals as one signal is slid over the other, while being multiplied by it.

Figure 11:
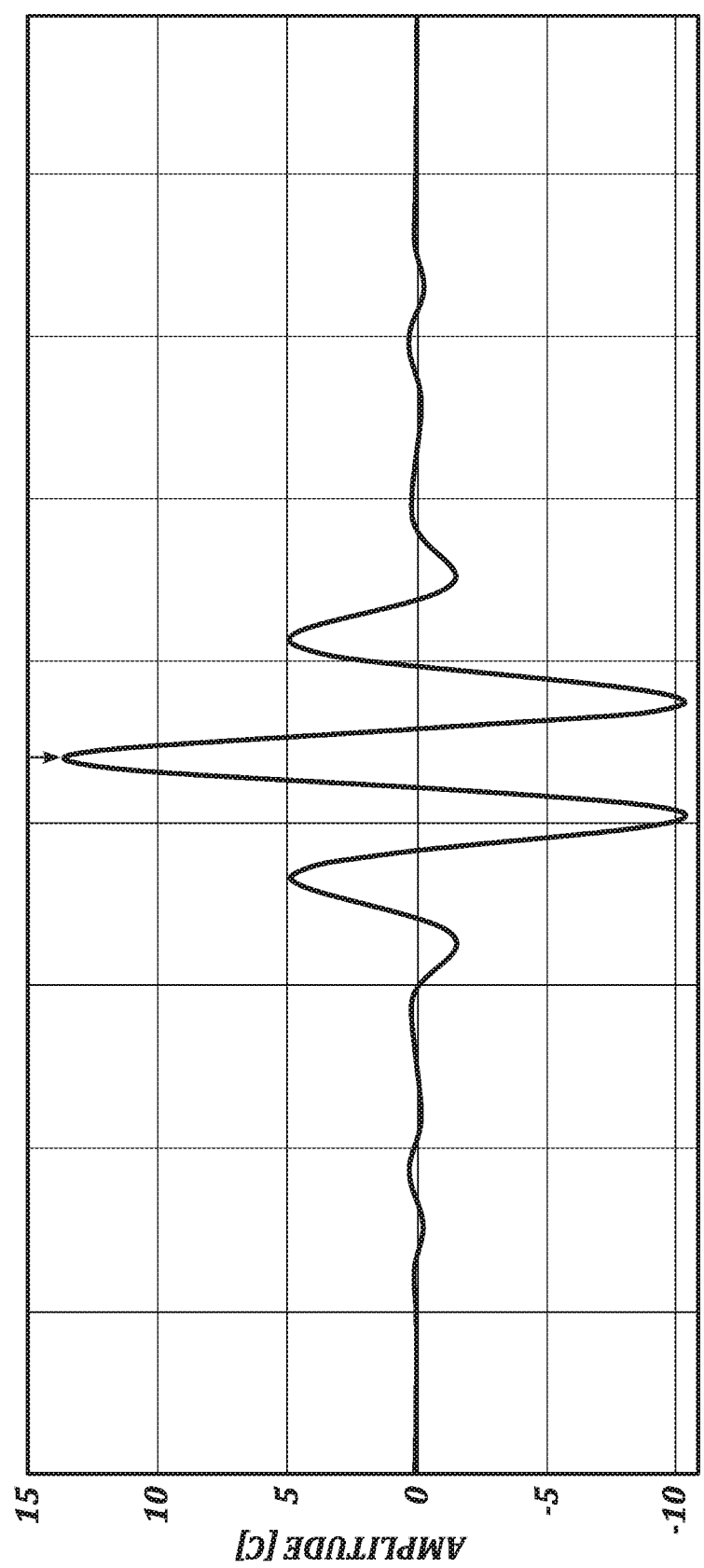
FIG. 11 is a graph of a cross-correlation of transducer data in accordance with embodiments of the presently disclosed technology.

FIG. 11 is a graph of a cross-correlation of transducer data in accordance with embodiments of the presently disclosed technology. The cross-correlation corresponds to the two reflections from the end of the delay line shown in FIG. 6A. The horizontal axis corresponds to a nominal time difference between the two signals, and the vertical axis is the corresponding result obtained by equation (7). The point of maximum correlation generally occurs when the two signals are most aligned (if there are no phase shifts). The location of the maximum on the horizontal axis identifies the time difference between the two signals. Since the two signals in FIG. 6A are fairly similar and both are reasonably wideband, the cross-correlation curve has a relatively distinct maximum. On the other hand, signals that are not similar and/or are narrow-band signals may not produce a distinctive maximum point.

In general, the measurement of precise location of maximum correlation (or time difference) depends on the sampling rate of the two signals. Everything else kept equal, a higher sampling rate generates more accurate results. Thus, in at least some embodiments, numerically resampled discrete signals may be used to find a more accurate measurement of the time difference.

Combinations of Curve Fitting, Resampling, and Cross-Correlating

In some embodiments, a combination of curve-fitting the signals, and then resampling the signals with a higher sampling rate, and finally finding the time difference between the two signals using cross-correlation produces improved results. Therefore, for Steps 4 and 5 that require the time measurements between two reflections, the combination of these techniques may be used. First, the cubic spline technique was used on each reflected signal to generate an accurate curve fit. Then, the signals were redefined by a higher sampling rate. Finally, the redefined signals with the higher sampling rate were cross-correlated to measure the time difference between them. The results obtained with such combination of steps are described with reference to FIG. 12 below.

Figure 12:
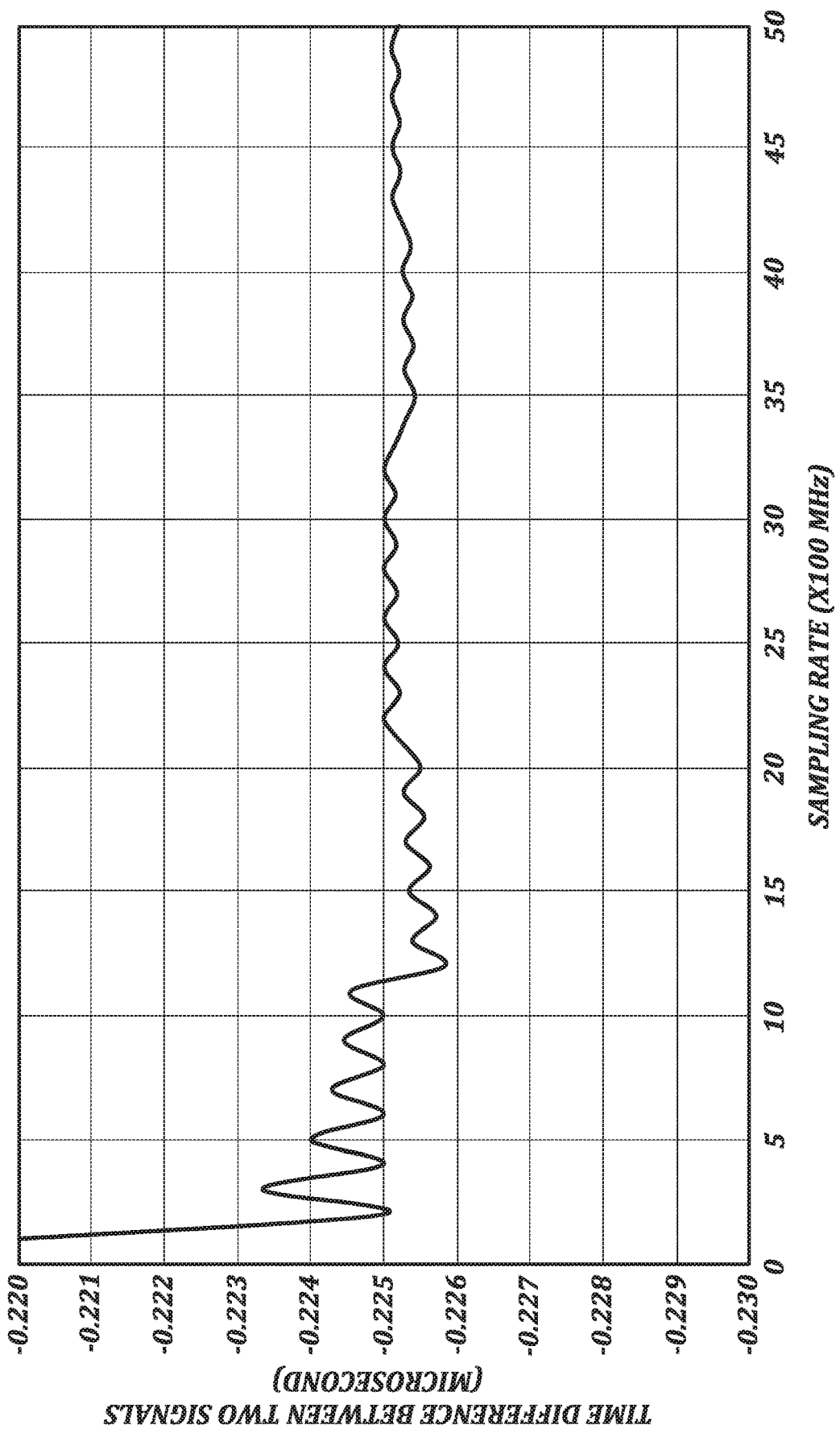
FIG. 12 is a graph illustrating accuracy of transducer measurements in accordance with embodiments of the presently disclosed technology.

FIG. 12 is a graph illustrating accuracy of transducer measurements in accordance with embodiments of the presently disclosed technology. The horizontal axis corresponds to the sampling rate, and the vertical axis corresponds to the ultimately-detected time difference between the two signals, for example signals shown in FIG. 6A. FIG. 12 shows that a typical measured value of time difference between the two signals converges to a specific value as the sampling rate increases. As FIG. 12 shows, the time difference measurements oscillate while converging with increased sampling rate. In this study, the final time difference was calculated by taking the average of the time differences for a 4-5 GHz sampling rate.

Selecting Different Signal for Synchronization of Waveforms

In the above-described methods, the reflections from the end of the delay line were used to synchronize the two waveforms taken at two different periods. This was done under the assumption that the corroded back wall surface degrades the ultrasonic signals and only one reflection from the back wall that can be obtained. When a surface is sufficiently corroded that only one back wall reflection is available, a reflection from the end of the delay line is used to align the two waveforms.

However, if more than one reflected signal from the back wall is available (such a waveform is shown in FIG. 2B), the two waveforms may be aligned based on the first reflected signals from the back wall and the second reflected signals from the back wall used to find the time shift due to reduction of the thickness. Therefore, the same procedure as above may be used, but instead of using the reflected signal from the end of the delay line to synchronize the two waveforms, the first reflections from the back wall are used. Then, the second reflections from the back wall are used to find the time shift. In some embodiments, this method provides good accuracy because the signals are similar in shape and the time difference between them can be relatively accurately measured.

In other embodiments, other reflections from the back wall may be used. For example, the second reflection from the back wall can be used for alignment of the signals, and the third reflection from the back wall can be used to find the time shift. The analogous procedure can be used with subsequent reflections from the back wall.

Automation of Functions

In some embodiments, the data collection and analysis process may be automatized by a computer program. For example, rather than requiring manual intervention to trigger data collection, the program may include a schedule for data collection, access to a system clock or related timekeeping mechanism, and instructions to compare the system time to the schedule for data collection and trigger a data collection function when the scheduled time for data collection has been reached.

The data collection function may send a signal to a microcontroller or some other device that triggers the ultrasonic transducer to produce a pulse and record a digitized waveform data. The function may then transfer the data to a long-term storage medium. Alternately, the data collection function may analyze the temporarily stored waveform for data quality by, for example, determining if a waveform contains at least two substantial perturbations in the signal separated by a period of minimal response. If the waveforms lack the necessary features, the data collection function could restart the data collection process. If the necessary features are present, the data may then be transferred to a longer-term storage medium.

In some embodiments, the presence of multiple data sets in long-term memory triggers a data alignment function to extract the data from long-term memory; determine common points or shapes among the recorded waveform data; use the common points or shapes to determine the initial temporal offset between data sets; and to align the datasets. Once aligned, the datasets can be analyzed.

In some embodiments, interpolation and extrapolation may be used in conjunction with stored datasets to determine speed of sound that takes into account temperature variance between measurements. In some embodiments, data refinement techniques such as average multiple recordings are performed at the same time to improve data reliability, corrosion rate threshold settings are set to warn if corrosion changes substantially between measurements, etc.

Representative Results

No Averaging

To confirm the accuracy of the procedure explained above, a carbon steel sample with a thickness of around 0.5 inch (12 mm) was tested. A wide band 7.5 MHz transducer with a delay line was attached to the sample using 5-minute epoxy). After the transducer was attached to the sample, the thickness measurement was performed.

It was not possible to measure the thickness of the sample manually directly under the transducer by a micrometer. Instead, the thickness of the sample at four locations around the transducer (very close to transducer) was measured with the micrometer and the average value of these four thicknesses was recorded as the thickness of the sample directly under the transducer. After the thickness measurement, the transducer was connected to the pulser/receiver and the initial waveform was collected and recorded. In addition to thickness and waveform, the temperature of the sample was also recorded.

To simulate thickness reduction due to corrosion, the opposite side of the sample (opposite to the transducer) was sanded to remove several microns of material. After the removal of the material, the sample was cleaned and allowed to stabilize thermally at room temperature. When the temperature of the sample stabilized at room temperature, the thickness of the sample was measured again by the micrometer as explained above. After the micrometer measurement of thickness, the transducer was pulsed with the pulser/receiver and the waveform was recorded. The temperature of the sample was recorded at the same time the waveform was taken.

This procedure for reducing the thickness and taking data was repeated to obtain many data points to ensure the results are statistically significant. As the data were being taken, the signal processing technique explained above—a combination of cubic spline, resampling, and cross-correlation—was applied to the waveforms and the thickness reduction was computed. A total of 12 thickness reductions were made ranging from 16 to 141 microns. These 12 reductions cumulatively yielded 78 data points. The maximum deviation between computed results and measured results was 16 microns and the average deviation of the computed results from measured results was about 5 microns with a standard deviation of 3.5 microns. Therefore, when no averaging is used to capture the waveforms, the inaccuracy in the results could be as high as ±16 microns.

Figure 13A:
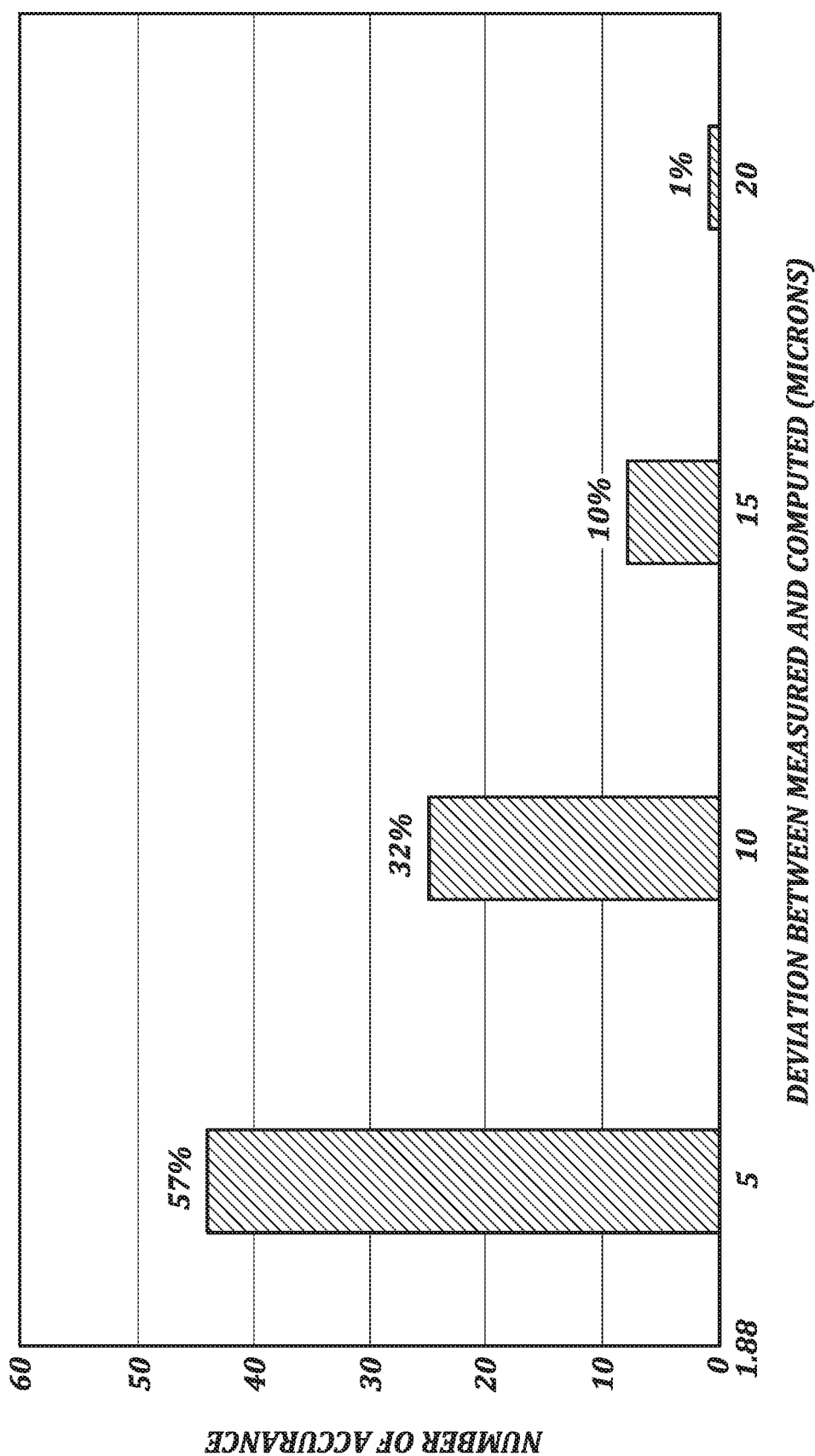
FIGS. 13A and 13B are comparisons between measured and computed wall thickness in accordance with embodiments of the presently disclosed technology.

FIG. 13A shows the distribution of deviation between measured and computed results. As FIG. 13A shows, the majority of the results (57%) have deviations less than ±5 microns and almost 90% of the results have deviations less than ±10 microns. FIG. 13A is a comparison between measured and computed wall thickness in accordance with embodiments of the presently disclosed technology. The vertical axis shows a percentage of samples falling within the range of accuracy indicated on the horizontal axis. For example, 57% of all transducer measurements were accurate within ±5 microns of the corresponding micrometer measurements. Additionally, 32% of all transducer measurements were accurate within ±10 microns of the corresponding micrometer measurements.

Averaging

Figure 13B:
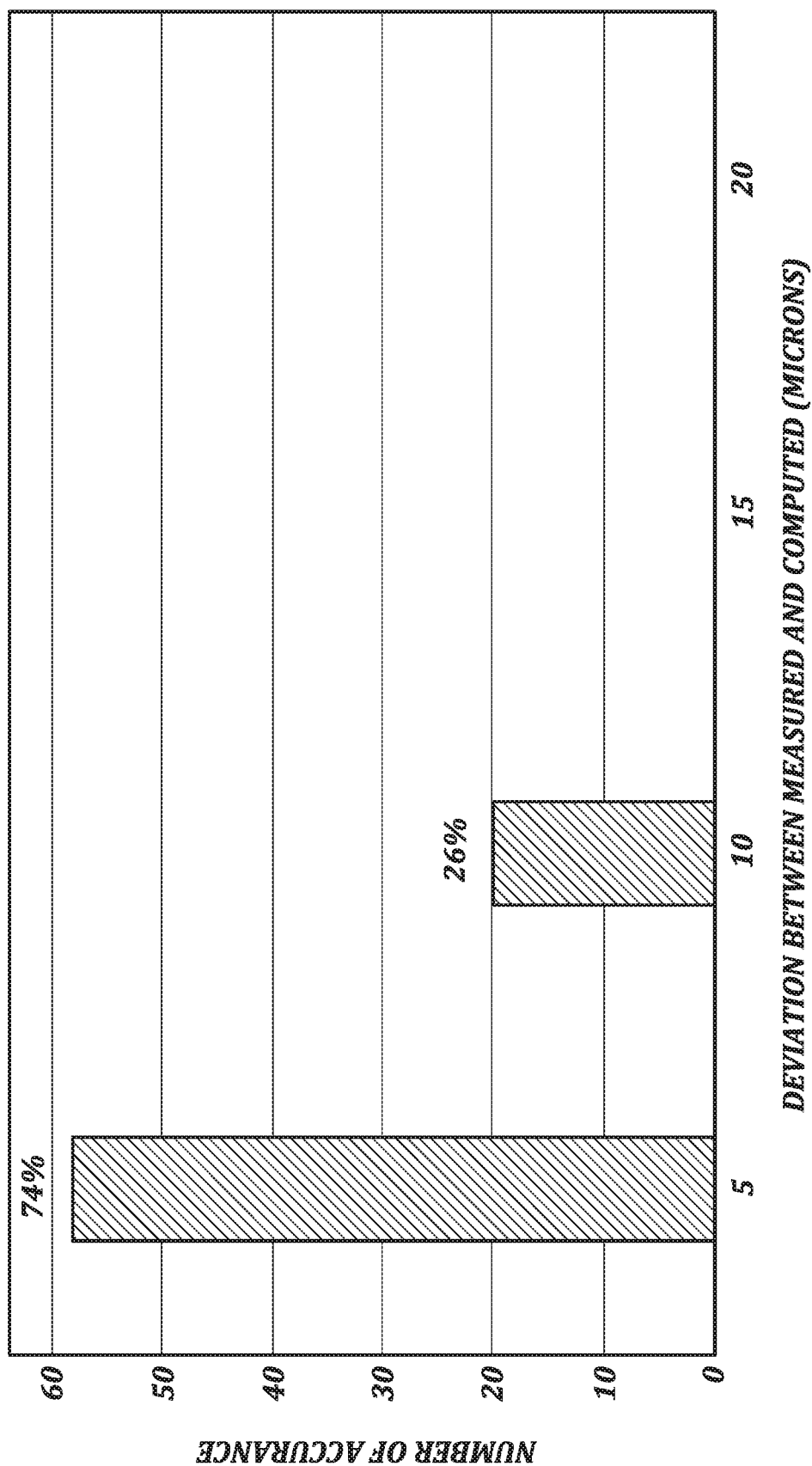

To increase the accuracy of the procedure, averaging can be used to obtain the waveforms. As explained above, averaging can reduce some of the electronics noise and jitter associated with obtaining ultrasonic waveforms. FIG. 13B shows comparisons between measured and computed wall thickness when averaging is used. For the illustrated set of data, 64 averages were used to record the waveforms by the transducer. The same procedure as in the case without averaging was used to reduce the thickness of the sample in order to simulate wall loss due to corrosion.

The vertical axis shows a percentage of samples falling within the range of accuracy indicated on the horizontal axis. FIG. 13B indicates accuracy improvements in comparison to no-averaging results shown in FIG. 13A. For example, 74% of all transducer measurements were accurate within ±5 microns of the corresponding micrometer measurements. Additionally, 100% of all transducer measurements were accurate within ±10 microns of the corresponding micrometer measurements. Therefore, when 64 averages are used to capture the waveforms, the inaccuracy in the results is reduced to less than ±10 microns. The average deviation of the computed results from measured results is about 3 microns with standard deviation of 2.3 microns. Therefore, when 64 averages are used to capture the waveforms, the inaccuracy in the results is reduced to less than ±10 microns. The transducer in this study used an average of 64 data.

Temperature Correction

In some embodiments, temperature can have significant effect on the accuracy of the results. If the temperature variation during data collection is relatively small (e.g., ±5° C.), the resulting error will be within a few microns. However, as the temperature variation gets larger, the error in the result may become significant.

Two factors cause measurement errors when the temperature of the sample changes. The first factor is the variation of the speed of sound with respect to temperature changes in the material. The second factor is the difference in the thickness of the material due to linear thermal expansion of the material under the test. Since these two factors are material dependent, their values for the sample under test should be used to improve the accuracy of the measurement.

To determine the temperature correction factor, the following scenario is considered. In situation 1, the temperature is $T_1$, the thickness of the sample is $L_1$, the speed of sound is $V_1$, and the time that it takes for the ultrasonic waves to travel from the top of the sample (e.g., the end of the delay line) to the bottom of the sample and return back is $t_1$. In situation 2, the temperature changed to $T_2$, and consequently the thickness of the sample and the speed of sound changed to $L_2$ and $V_2$. Furthermore, in situation 2, some additional corrosion has occurred causing a metal loss, while the remaining wall thickness is $L_r$. Therefore, the time for the ultrasonic waves to travel from the top of the sample (e.g., end of the delay line) to the top of corroded area and return back is $t_2$. The length of the corroded region is $L_c$, which is measured at $T_2$.

An advantage of the inventive technology is that the changes in the ultrasonic transducer and the delay line due to temperature variation may be ignored. This is because by aligning the two reflections from the bottom of the delay line, the changes in the transducer and delay line are bypassed and may be removed from our calculations (as explained in Step 4 of the procedure).

It can be shown that the remaining thickness of the metal ($L_r$) in situation 2 can be expressed as:

$$L_r = L_1(1+\alpha\Delta T) - L_c \quad (8)$$

where $\alpha$ is the linear thermal coefficient. Furthermore, the speed of sound in situation 2 can be expressed as:

$$V_2 = V_1 + \beta\Delta T \quad (9)$$

where $\beta$ is the slope of the curve of the speed of sound versus temperature. Both $\alpha$ and $\beta$ can be found in the literature or measured experimentally. It can also be shown that the metal loss can be expressed as:

$$L_c = \frac{-V_1\Delta t}{2} + \left[L_1\left(\alpha - \frac{\beta}{V_1}\right) - \frac{\beta\Delta t}{2}\right]\Delta T \quad (10)$$

The first term of equation 10, $$\left(\frac{-V_1\Delta t}{2}\right),$$

determines the metal loss as if there was no temperature change. The second term of equation 10 is the temperature correction factor that adjusts the measured metal loss based on the temperature change.

In many practical situations, the thermal coefficient $\alpha$ is considerably smaller than $\beta$, and in most cases where temperature variation is not very large (less than 100° C.) and where the thickness of the sample is relatively small (around 1 inch), the contribution of the thermal coefficient $\alpha$ may be neglected. By elimination of the linear thermal coefficient factor, ($\alpha$), equation 10 can be simplified to:

$$L_c = \frac{-V_1 \Delta t}{2} - \beta \Delta T \left( \frac{L_1}{V_1} + \frac{\Delta t}{2} \right) \quad (11)$$

Equation 11 determines the metal loss due to corrosion when the speed of sound at situation 1, where temperature is $T_1$, is known. However, there are situations that the speed of sound is known at a particular temperature, but the data (both situation 1 and 2) are collected at different temperatures. For example, many pipes are operated at elevated temperatures and the speeds of sound for such pipes are available for ambient temperature. In such cases that the speed of sound is not known at the temperatures when data are collected, the correction formulation is different. An example of such correction formulation is described below.

At a reference condition, the speed of sound, the temperature and the thickness are denoted as $V_0$, $T_0$ and $L_0$. Furthermore, the waveforms are collected at two different periods and two different conditions where the speed of sound and the temperatures are $V_1$, $T_1$ and $V_2$, $T_2$. Considering a linear variation of speed of sound against temperature, we can express the velocities at situations 1 and 2 as:

$$V_1 = V_0 + \beta \Delta T_1 \quad (12)$$

$$V_2 = V_0 + \beta \Delta T_2 \quad (13)$$

where:

$$\Delta T_1 = T_1 - T_0 \quad (14)$$

$$\Delta T_2 = T_2 - T_0 \quad (15)$$

By combining the above equations and considering the thermal coefficient $\alpha$ as negligible, the length of metal loss ($L_c$) can be expressed as:

$$L_c = \frac{-V_0 \Delta t}{2} - \frac{\beta \Delta T_2 \Delta t}{2} + \left(1 - \frac{V_0 + \beta \Delta T_2}{V_0 + \beta \Delta T_1}\right) \quad (16)$$

In equation 16, $\Delta t$ may calculated between two waveforms collected at different temperatures $T_1$ and $T_2$, and the speed of sound at a reference temperature $V_0$ is used to find the metal loss $L_c$.

Temperature Correction Experiments

Figure 14:
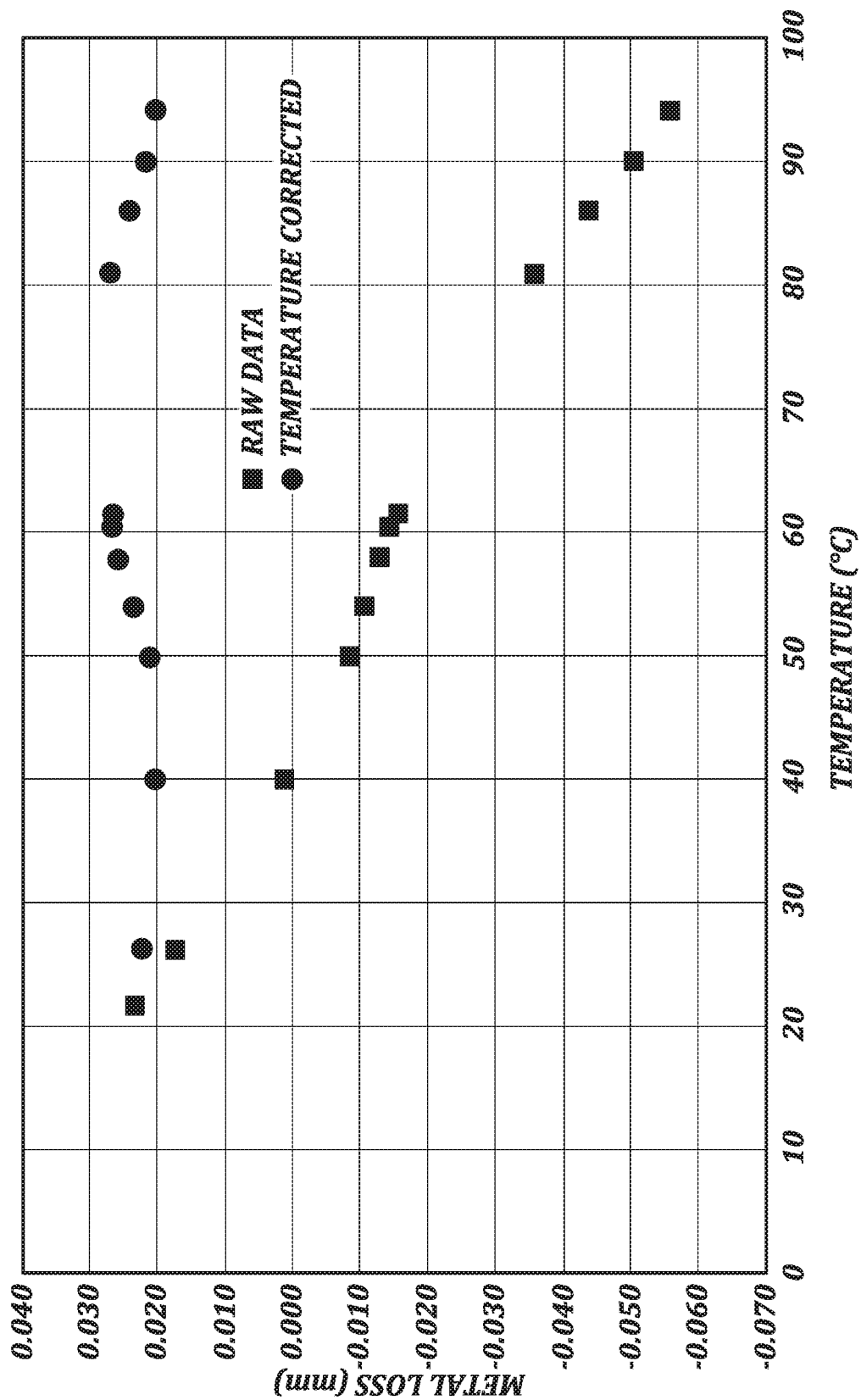
FIG. 14 is a graph illustrating accuracy of transducer measurements with temperature correction in accordance with embodiments of the presently disclosed technology.

FIG. 14 is a graph illustrating accuracy of transducer measurements with temperature correction in accordance with embodiments of the presently disclosed technology. The horizontal axis corresponds to sample temperature in centigrade, and the vertical axis corresponds to calculated loss of material in mm. Test sample was the same carbon steel sample used in previous experiments.

Experiments were performed at various temperatures to simulate data collection in a real environment. The temperature of the sample was gradually increased from 22° C. to 94° C. and several waveforms were collected at different temperatures. These waveforms were used to calculate the speed of sound at different temperatures. Although temperature increases change the thickness of the sample ($L_1$), this change is not significant for many practical cases, and was neglected in these results. In use cases with a higher temperature differential between measurements or a material with properties that change significantly with temperature, the change in thickness may need to be considered.

After determining the values of $L_1$, $V_1$, and $\beta$, the thickness of the sample was reduced by 22 microns to simulate metal loss due to corrosion. Then, the temperature of the sample was gradually increased and more UT waveforms were collected at different temperatures. The same procedure as described in Steps 1 to 6 was performed to find time shift $\Delta t$. Equation 16 was used to perform the temperature correction.

In FIG. 14, the thickness of the sample before the correction is shown by square symbols, and the thickness of the sample after the correction is shown by circle symbols. As shown in FIG. 14, the metal loss calculation changes with the change in temperature. In this experiment, 22 microns was removed from the thickness of the sample (i.e., metal loss=22 microns). Therefore, the correct measurements should indicate 0.022 mm on the vertical axis. However, raw data without temperature correction (square symbols) show a steady decrease in the value of metal loss as the temperature increases, resulting in increased measurement error. Temperature corrected values (circle symbols) of metal loss is fairly close to 0.022 mm, indicating successful temperature correction.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

I claim:

1. A method for measuring a rate of corrosion progress in a specimen, comprising:
generating a first initial pulse into the specimen by an ultrasonic transmitter;
acquiring a first reflected waveform from the specimen by an ultrasonic receiver, wherein the first reflected waveform includes a first reflection of the first waveform and a second reflection of the first waveform;
generating a second initial pulse into the specimen by the ultrasonic transmitter, wherein the first initial pulse and the second initial pulse are separated by a time period;
acquiring a second reflected waveform from the specimen by the ultrasonic receiver, wherein the second reflected waveform includes a first reflection of the second waveform and a second reflection of the second waveform; and determining the rate of corrosion by:
  fitting a first continuous curve through discrete points of the first reflection of the first waveform;
  fitting a second continuous curve through discrete points of the first reflection of the second waveform;
  aligning the first reflection of the first waveform and the first reflection of the second waveform based on aligning the first curve and the second curve,
  determining a time difference between the second reflection of the first waveform and the second reflection of the second waveform, and
  based on the time difference, determining the rate of corrosion progress using a speed of ultrasound through the specimen.

2. The method of claim 1, wherein the ultrasonic transmitter comprises a delay line.

3. The method of claim 2, wherein the first reflection of the first waveform and the first reflection of the second waveform are first reflections from the delay line.

4. The method of claim 3, wherein the second reflection of the first waveform and the second reflection of the second waveform are first reflections from a back wall of the specimen.

5. The method of claim 2, wherein the first reflection of the first waveform and the first reflection of the second waveform are first reflections from a back wall of the specimen.

6. The method of claim 5, wherein the second reflection of the first waveform and the second reflection of the second waveform are second reflections from a back wall of the specimen.

7. The method of claim 2, wherein the first curve and the second curve are selected from a group consisting of a polynomial and a spline.

8. The method of claim 2, wherein the first reflected waveform and the second reflected waveform are acquired at a first sampling frequency, the method further comprising:
  resampling the first curve and the second curve at a second sampling frequency that is higher than the first sampling frequency; and
  aligning the first reflection of the first waveform and the first reflection of the second waveform based on additional discrete points obtained by the second sampling frequency.

9. The method of claim 2, further comprising:
cross-correlating the first curve and the second curve;
identifying a maximum of a cross-correlation between the first curve and the second curve; and
aligning the first reflection of the first waveform and the first reflection of the second waveform at least in part based on the maximum of the cross-correlation.

10. The method of claim 1, wherein aligning the first reflection of the first waveform and the first reflection of the second waveform is based on aligning a maximum of the first reflection of the first waveform and a maximum of the first reflection of the second waveform.

11. The method of claim 1, wherein aligning the first reflection of the first waveform and the first reflection of the second waveform comprises superimposing the first reflection of the first waveform and the first reflection of the second waveform over each other when the first waveform and the second waveform are displayed visually.

12. The method of claim 1, further comprising:
  generating additional initial pulses into the specimen by the ultrasonic transmitter;
  acquiring additional reflected waveforms from the specimen; and
  averaging the additional multiple waveforms to produce averaged first reflected waveform and averaged second reflected waveform.

13. The method of claim 1, wherein the time period is less than one month.

14. The method of claim 1, further comprising:
  measuring a first temperature of the specimen corresponding to the first reflected waveform from the specimen;
  measuring a second temperature of the specimen corresponding to the second reflected waveform from the specimen; and
  determining the rate of corrosion based at least in part on a difference between the first temperature and the second temperature.

15. A non-transitory computer readable medium having computer-executable instructions stored thereon that, in response to execution by one or more processors of a computing device, cause the computing device to perform actions comprising:
  generating a first initial pulse into the specimen by an ultrasonic transmitter comprising a delay line;
  acquiring a first reflected waveform from the specimen by an ultrasonic receiver, wherein the first reflected waveform includes a first reflection of the first waveform and a second reflection of the first waveform;
  generating a second initial pulse into the specimen by the ultrasonic transmitter, wherein the first initial pulse and the second initial pulse are separated by a time period;
  acquiring a second reflected waveform from the specimen by the ultrasonic receiver, wherein the second reflected waveform includes a first reflection of the second waveform and a second reflection of the second waveform; and
  determining the rate of corrosion by:
    fitting a first continuous curve through discrete points of the first reflection of the first waveform;
    fitting a second continuous curve through discrete points of the first reflection of the second waveform;
    aligning the first reflection of the first waveform and the first reflection of the second waveform based on aligning the first curve and the second curve,
    determining a time difference between the second reflection of the first waveform and the second reflection of the second waveform, and
    based on the time difference, determining the rate of corrosion progress using a speed of ultrasound through the specimen.

16. The non-transitory computer readable medium of claim 15, wherein the first reflection of the first waveform and the first reflection of the second waveform are first reflections from the delay line.

17. The non-transitory computer readable medium of claim 16, wherein the second reflection of the first waveform and the second reflection of the second waveform are first reflections from a back wall of the specimen.

18. The non-transitory computer readable medium of claim 15, wherein the actions further comprise:
  generating additional initial pulses into the specimen by the transducer transmitter;
  acquiring additional reflected waveforms from the specimen; and
  averaging the additional multiple waveforms to produce averaged first reflected waveform and averaged second reflected waveform.

19. The non-transitory computer readable medium of claim 15, wherein the actions further comprise:
  cross-correlating the first curve and the second curve; and
  identifying a maximum of a cross-correlation between the first curve and the second curve,
  wherein aligning the first reflection of the first waveform and the first reflection of the second waveform is based at least in part on the maximum of the cross-correlation.

\* \* \* \* \*

UNITED STATES PATENT AND TRADEMARK OFFICE
CERTIFICATE OF CORRECTION

PATENT NO. : 11,119,031 B2
APPLICATION NO. : 16/639097
DATED : September 14, 2021
INVENTOR(S) : A. Minachi Page 1 of 1

It is certified that error appears in the above-identified patent and that said Letters Patent is hereby corrected as shown below:

In the Claims

| Column | Line | |
|---|---|---|
| 26 | 61 | change "transducer" to -- ultrasonic --. |

Signed and Sealed this
First Day of August, 2023

Katherine Kelly Vidal
*Director of the United States Patent and Trademark Office*